United States Patent
Lee et al.

(10) Patent No.: US 11,399,388 B2
(45) Date of Patent: Jul. 26, 2022

(54) METHOD AND DEVICE FOR TRANSMITTING UPLINK SIGNAL IN WIRELESS COMMUNICATION SYSTEM

(71) Applicant: LG ELECTRONICS INC., Seoul (KR)

(72) Inventors: Hyunho Lee, Seoul (KR); Kyuhwan Kwak, Seoul (KR); Seungmin Lee, Seoul (KR); Daesung Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/961,171

(22) PCT Filed: Jan. 16, 2019

(86) PCT No.: PCT/KR2019/000662
§ 371 (c)(1),
(2) Date: Jul. 9, 2020

(87) PCT Pub. No.: WO2019/143131
PCT Pub. Date: Jul. 25, 2019

(65) Prior Publication Data
US 2020/0359403 A1    Nov. 12, 2020

Related U.S. Application Data

(60) Provisional application No. 62/701,824, filed on Jul. 22, 2018, provisional application No. 62/634,163, (Continued)

(30) Foreign Application Priority Data

Sep. 20, 2018 (KR) .................. 10-2018-0113299

(51) Int. Cl.
*H04W 28/04* (2009.01)
*H04W 72/12* (2009.01)

(52) U.S. Cl.
CPC ... *H04W 72/1284* (2013.01); *H04W 72/1242* (2013.01)

(58) Field of Classification Search
CPC ......... H04W 72/1242; H04W 72/1284; H04W 28/04; H04W 72/0406; H04W 72/0413; H04W 72/10; H04W 72/12
See application file for complete search history.

(56) References Cited

U.S. PATENT DOCUMENTS

2014/0192738 A1* 7/2014 Nam ................. H04W 52/346
370/329
2015/0036618 A1* 2/2015 Xu ..................... H04L 5/0053
370/329

(Continued)

FOREIGN PATENT DOCUMENTS

KR        101298799 B1    8/2013
KR    1020160040236 A    4/2016

OTHER PUBLICATIONS

LG Electronics, "Joint coding of segmented UCI", 3GPP TSG RAN WG1 Meeting 91, Nov. 27-Dec. 1, 2017, R1-1719940.
(Continued)

*Primary Examiner* — Nathan S Taylor
(74) *Attorney, Agent, or Firm* — Dentons US LLP

(57) ABSTRACT

A method and a device for allowing a terminal to transmit a signal in a wireless communication system, according to one embodiment of the present invention, map first uplink control information (UCI) and second UCI to one specific uplink channel if a resource region for transmitting the first UCI and a resource region for transmitting the second UCI are overlapped in a time domain, and transmit the specific uplink channel. Particularly, the specific uplink channel comprises a first bit payload for the first UCI and a second bit payload for the second UCI, wherein the number of bits (Continued)

of the first bit payload and the number of bits of the second bit payload are determined on the basis of preset ratio information.

15 Claims, 8 Drawing Sheets

Related U.S. Application Data filed on Feb. 22, 2018, provisional application No. 62/630,782, filed on Feb. 14, 2018, provisional application No. 62/622,988, filed on Jan. 29, 2018, provisional application No. 62/618,624, filed on Jan. 17, 2018.

(56) References Cited

U.S. PATENT DOCUMENTS

| | | | | |
|---|---|---|---|---|
| 2015/0341864 A1* | 11/2015 | Yang | ............... | H04W 52/281 455/522 |
| 2016/0007350 A1* | 1/2016 | Xiong | ............... | H04W 24/10 370/252 |
| 2018/0146472 A1* | 5/2018 | Kim | ............... | H04L 1/1692 |
| 2018/0167933 A1* | 6/2018 | Yin | ............... | H04L 5/0055 |
| 2018/0176937 A1* | 6/2018 | Chen | ............... | H04W 74/085 |
| 2019/0082431 A1* | 3/2019 | Yi | ............... | H04W 72/042 |
| 2019/0174472 A1* | 6/2019 | Lee | ............... | H04W 72/042 |
| 2019/0319824 A1* | 10/2019 | Rico Alvarino | ............... | H04L 5/005 |
| 2019/0327755 A1* | 10/2019 | Xiong | ............... | H04L 5/0055 |
| 2020/0037314 A1* | 1/2020 | Xiong | ............... | H04L 5/0091 |
| 2020/0322030 A1* | 10/2020 | Yuan | ............... | H04L 5/0091 |
| 2021/0160901 A1* | 5/2021 | Takeda | ............... | H04W 72/1268 |

OTHER PUBLICATIONS

Samsung, "PDCCH Design for URLLC", 3GPP TSG RAN WG1 Meeting 91, Nov. 27-Dec. 1, 2017, R1-1720325.
Qualcomm Incorporated, "Remaining issues for multiplexing UCI on PUSCH", 3GPP TSG RAN WG1 Meeting AH 1801, Jan. 22-26, 2018, R1-1800873.
R1-1720356: 3GPP TSG RAN WG, 1 Meeting #91, Reno, USA, Nov. 27-Dec. 1, 2017, "Details of conditions for UCI segmentation," Samsung, (7 Pages).

* cited by examiner

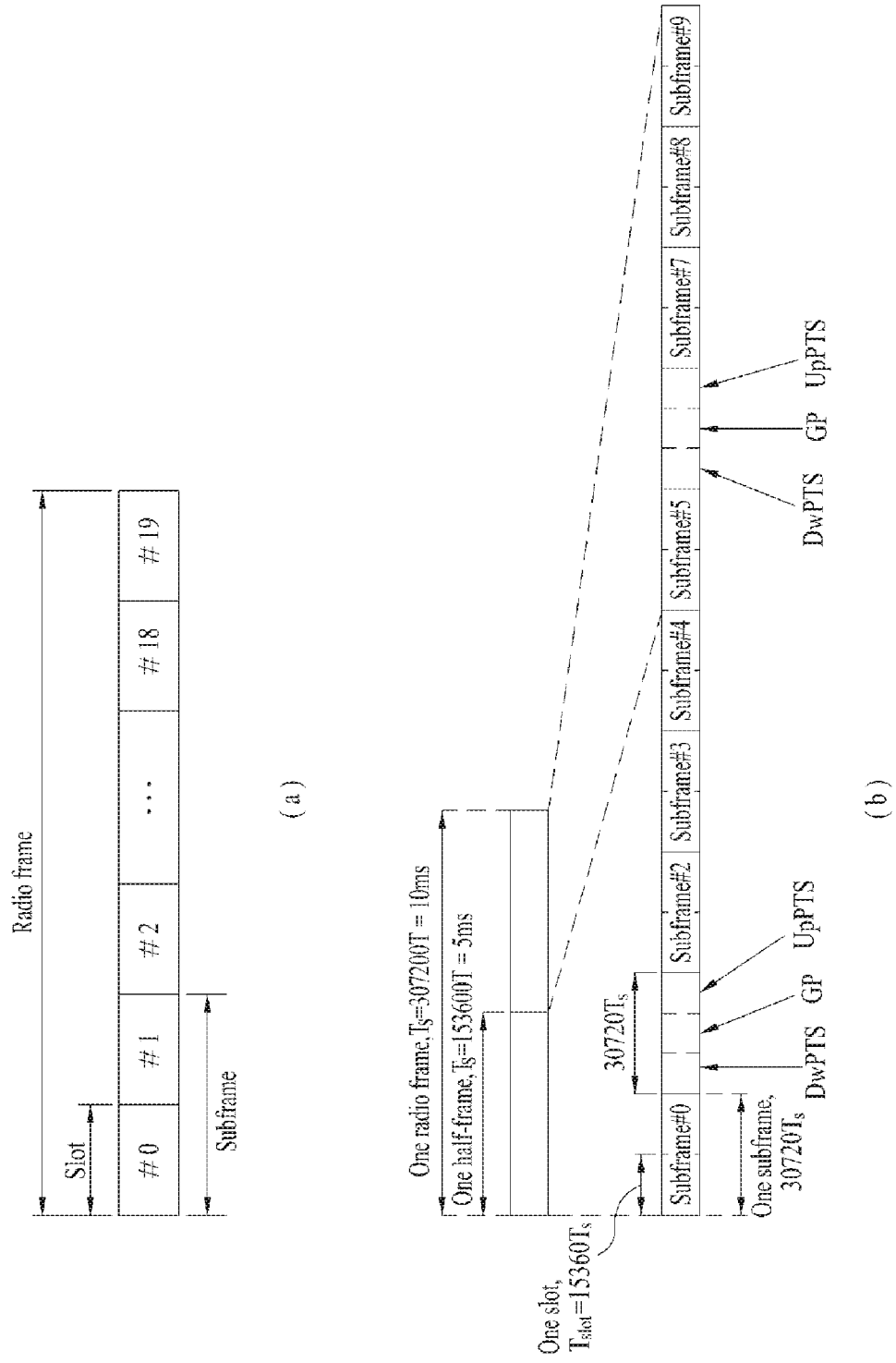
[FIG. 1]

[FIG. 2]
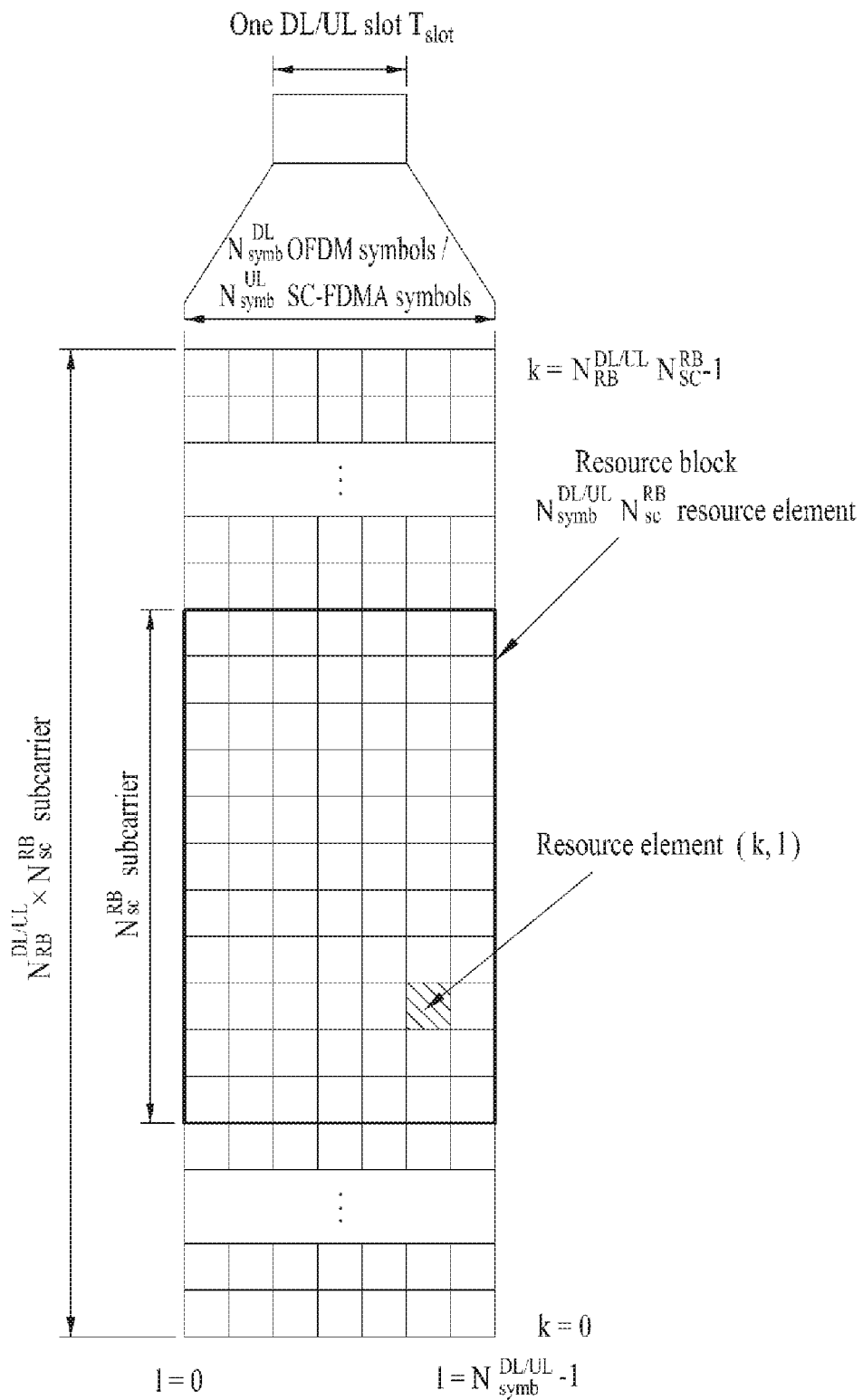

[FIG. 3]
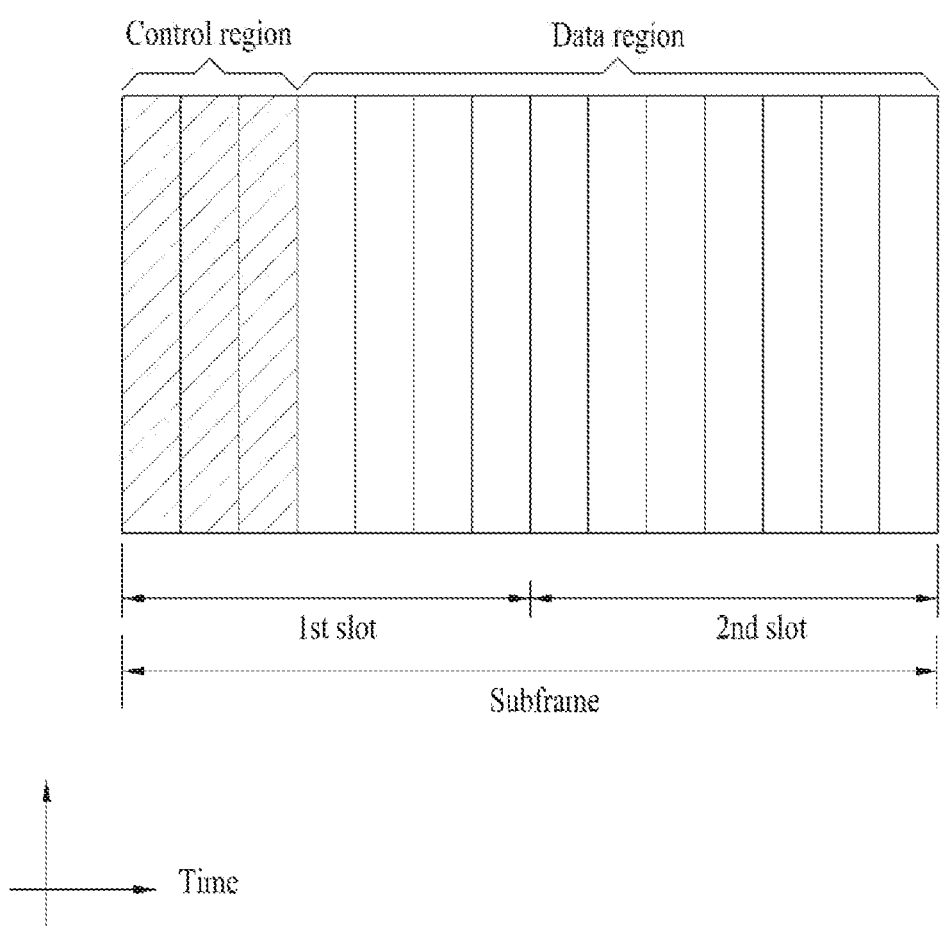

[FIG. 4]
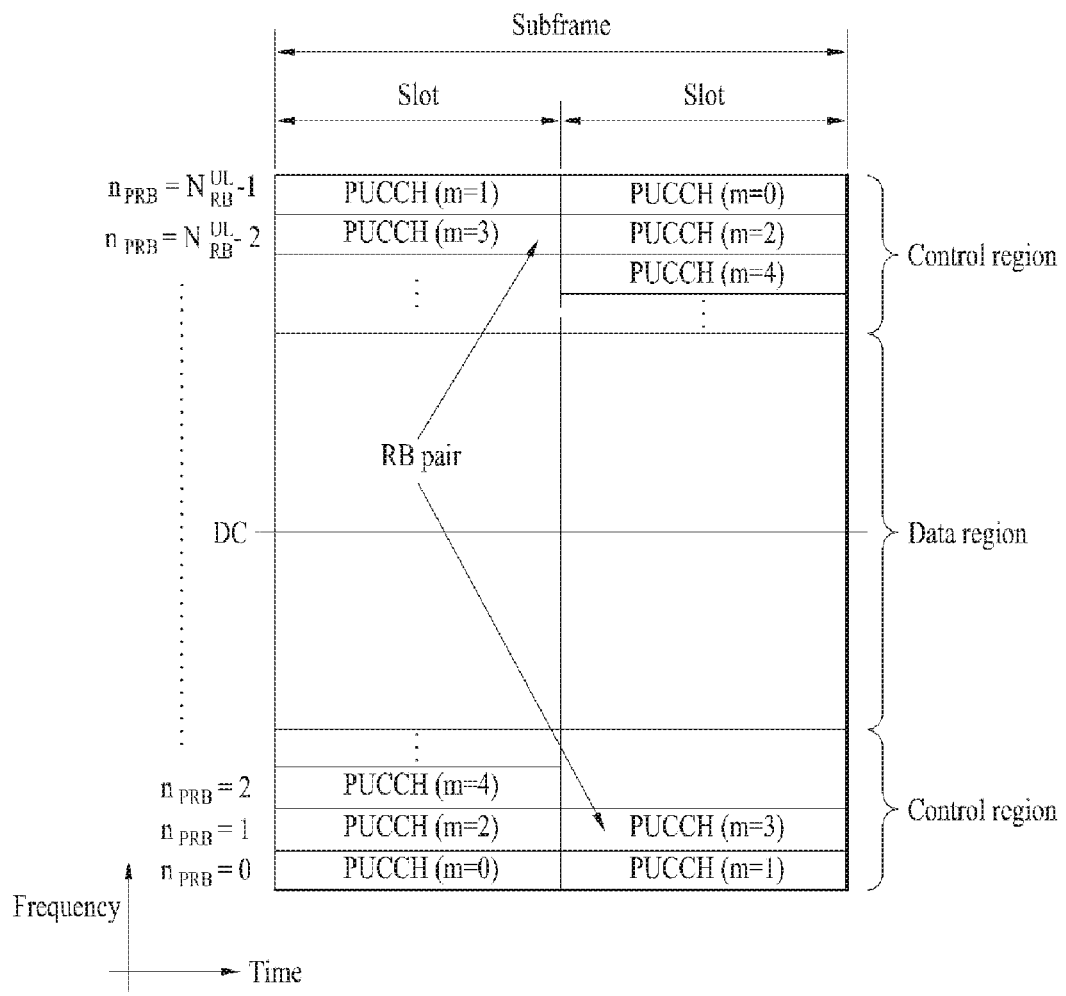

[FIG. 5]
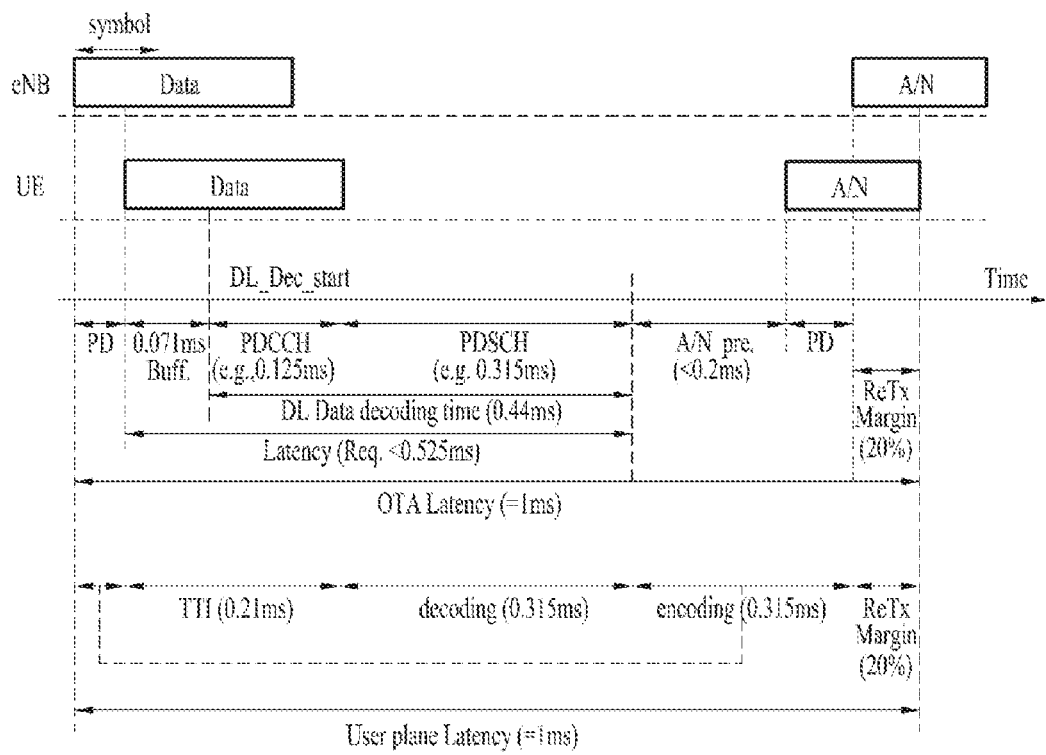
[FIG. 6]
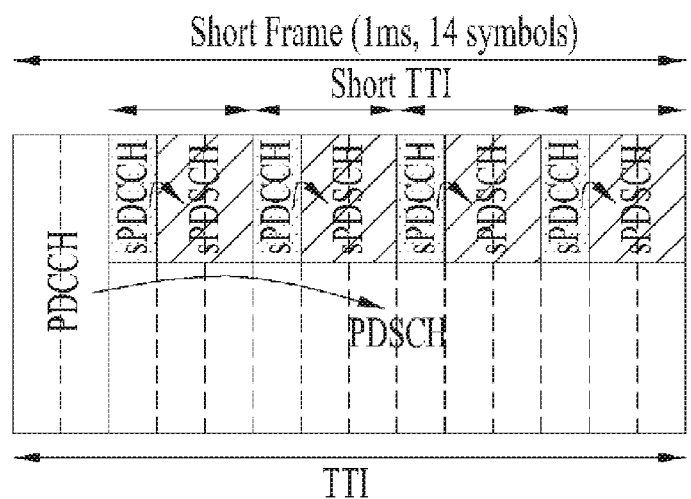

[FIG. 7]
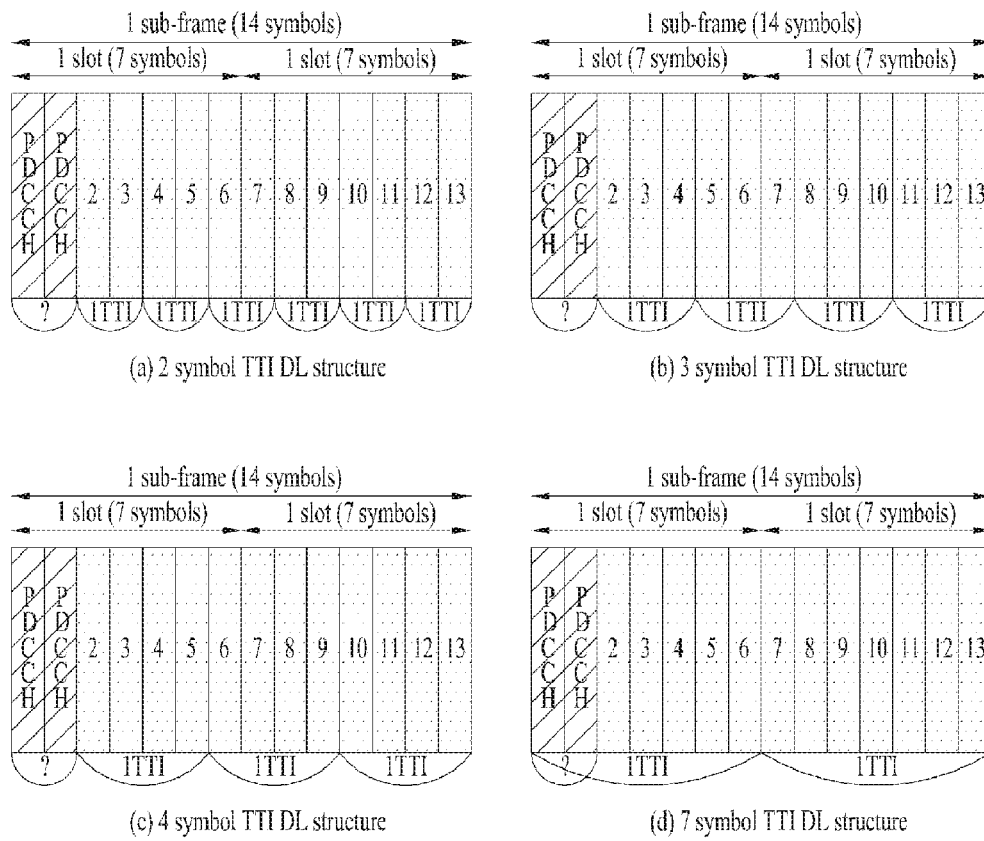
[FIG. 8]
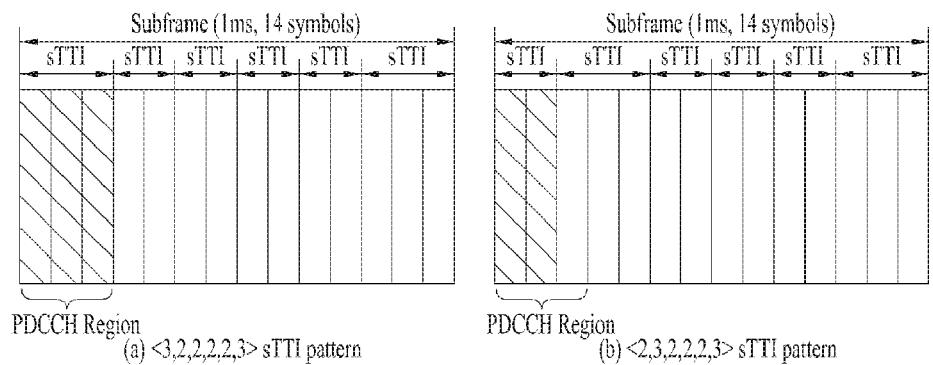

[FIG. 9]
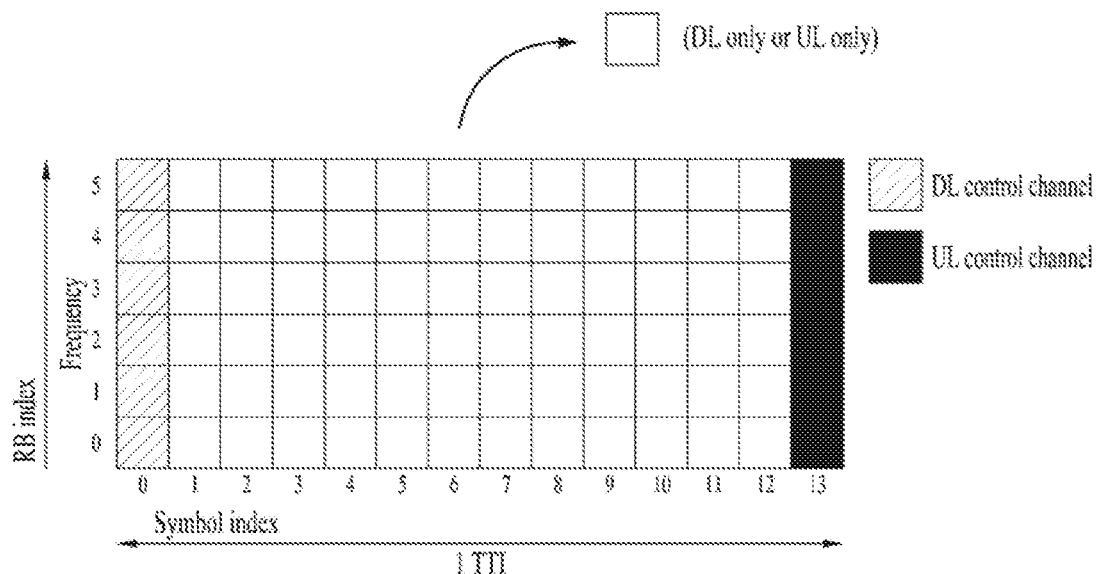
[FIG. 10]
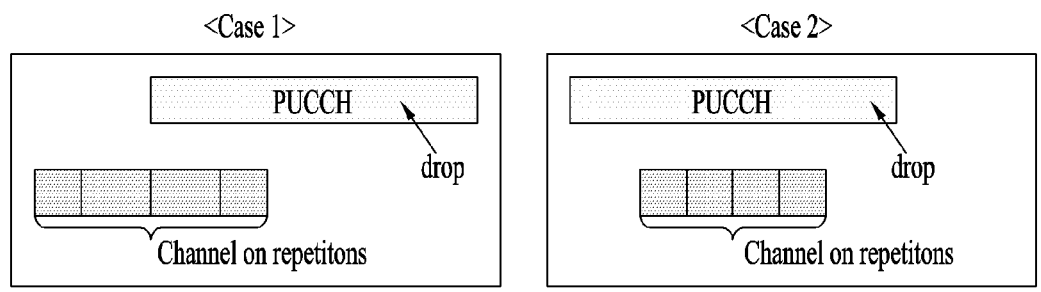

[FIG. 11]
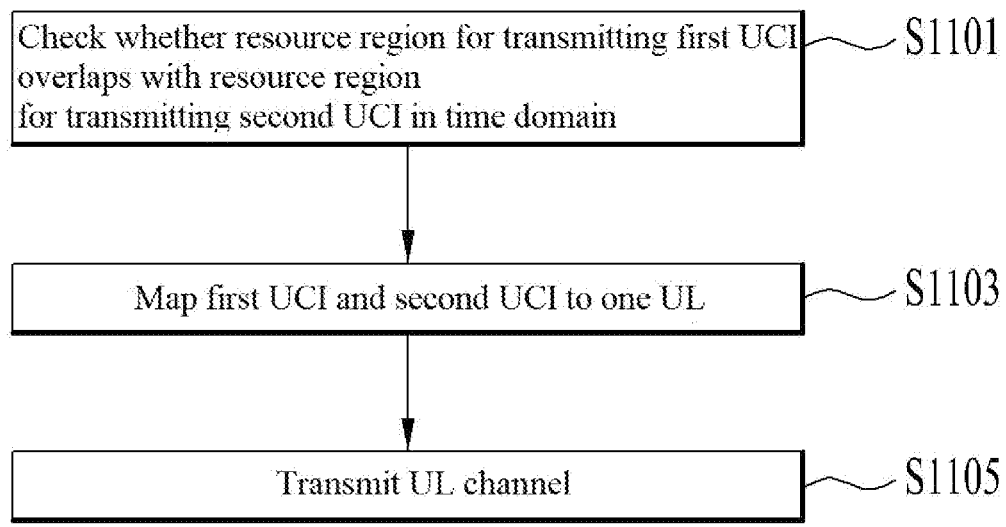
[FIG. 12]
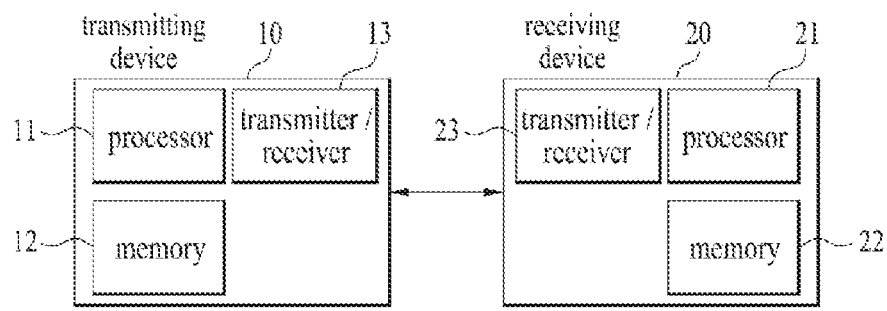

METHOD AND DEVICE FOR TRANSMITTING UPLINK SIGNAL IN WIRELESS COMMUNICATION SYSTEM

This application is the National Stage filing under 35 U.S.C. 371 of International Application No. PCT/KR2019/000662 filed on Jan. 16, 2019, which claims the benefit of U.S. Provisional Application Nos. 62/618,624 filed on Jan. 17, 2018; 62/622,988 filed on Jan. 29, 2018; 62/630,782 filed on Feb. 14, 2018; 62/634,163 filed on Feb. 22, 2018; 62/701,824 filed on Jul. 22, 2018, which claims the benefit of Korean Patent Application No. 10-2018-0113299 filed on Sep. 20, 2018, the contents of which are all hereby incorporated by reference herein in their entirety.

TECHNICAL FIELD

The present disclosure relates to a wireless communication system and to a method of transmitting a signal and an apparatus therefor. Specifically, the present disclosure relates to a method and apparatus for transmitting an uplink signal.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

The latency of packet data is one of important performance metrics. To reduce the latency of packet data and provide faster Internet access to an ender user is one of challenging issues in designing the next-generation mobile communication system called new radio access technology (RAT) as well as long term evolution (LTE).

The present disclosure provides a description related to a reference signal in a wireless communication system supporting a reduction in latency.

DETAILED DESCRIPTION OF THE DISCLOSURE

Technical Problems

An object of the present disclosure is to provide a method of transmitting an uplink signal of a user equipment (UE) and an apparatus therefor to efficiently transmit a plurality of uplink control information in a wireless communication system.

The objects of the present disclosure are not limited to what has been particularly described hereinabove and other objects may be derived from the embodiments of the present disclosure.

Technical Solutions

The present disclosure provides a method and apparatus for transmitting a signal in a wireless communication system.

According to an aspect of the present disclosure, provided herein is a method of transmitting a signal by a user equipment (UE) in a wireless communication system, including mapping first uplink control information (UCI) and second UCI to one specific uplink channel based on overlap between a resource region for transmitting the first UCI and a resource region for transmitting the second UCI in a time domain; and transmitting the specific uplink channel, wherein the specific uplink channel includes a first bit payload for the first UCI and a second bit payload for the second UCI, and the number of bits of the first bit payload and the number of bits of the second bit payload are determined based on preset ratio information.

In another aspect of the present disclosure, provided herein is a user equipment (UE) for transmitting an uplink signal in a wireless communication system, including a transceiver; and a processor configured to control the transceiver, wherein the processor: maps first uplink control information (UCI) and second UCI to one specific uplink channel based on overlap between a resource region for transmitting the first UCI and a resource region for transmitting the second UCI in a time domain; and controls the transceiver to transmit the specific uplink channel, and wherein the specific uplink channel includes a first bit payload for the first UCI and a second bit payload for the second UCI, and the number of bits of the first bit payload and the number of bits of the second bit payload are determined based on preset ratio information.

In the method and the UE, a priority of the first UCI may be higher than a priority of the second UCI, and the priority of the first UCI and the priority of the second UCI may be determined based on one or more of a target service, quality of service (QoS), block error rate (BLER), transmission reliability, transmission latency, and/or processing time.

The number of bits of the second bit payload may be determined based on the preset ratio information, based on the number of bits of the first bit payload after the number of bits of the first bit payload is first determined.

The number of bits of the first bit payload and the number of bits of the second bit payload may be determined based on the preset ratio information, based on a total number of bits of bit payloads included in the specific uplink channel.

An amount of transmission resources allocated to the specific uplink channel may be determined based on a maximum code rate configured for the first UCI and/or the number of bits of the first bit payload.

The UE may determine priorities of plural third UCIs transmitted by overlapping with the specific uplink channel in the time domain and map the plural third UCIs to the specific uplink channel based on the priorities.

The UE may drop transmission starting from third UCI with a relatively low priority among the plural third UCIs and/or bundle third UCIs with relatively low priorities among the plural UCIs, based on a resource region allocated to the specific uplink channel, insufficient to include all the plural third UCIs.

The UE may drop transmission starting from a third UCI with a relatively low priority among the plural third UCIs and/or bundle third UCIs with relatively low priorities among the plural UCIs, based on a code rate of an uplink shared channel (UL-SCH) greater than a threshold value in spite of increase of the number of resource blocks to be used to transmit the specific uplink channel up to a preset maximum number of resource blocks.

The specific uplink channel may be an uplink channel repeatedly transmitted at a predetermined period, the UE may map third UCI to the specific uplink channel based on overlap of entirety of the specific uplink channel within one period with an uplink channel including the third UCI in the time domain, and the UE may drop transmission of the third UCI based on overlap of only part of the specific uplink channel within one period with the uplink channel including the third UCI in the time domain.

The UE may determine a transmit power of an uplink channel including third UCI and a transmit power of an uplink channel including fourth UCI based on a priority of the third UCI and a priority of the fourth UCI, based on overlap between the uplink channel including the third UCI and the uplink channel including the fourth UCI in the time domain.

It will be understood by those skilled in the art that the above-described aspects of the present disclosure are merely part of the embodiments of the present disclosure and various modifications and alternatives could be developed from the following technical features of the present disclosure.

Advantageous Effects

According to an embodiment of the present disclosure, a user equipment (UE) may more efficiently transmit an uplink signal in consideration of overlap between uplink channels upon transmitting a plurality of UCIs.

The effects of the present disclosure are not limited to what has been particularly described hereinabove and other effects may be derived from the embodiments of the present disclosure.

DESCRIPTION OF DRAWINGS

FIG. 1 is a diagram for an example of a radio frame structure used in wireless communication system;

FIG. 2 is a diagram for an example of a downlink (DL)/uplink (UL) slot structure in a wireless communication system;

FIG. 3 is a diagram for an example of a DL subframe structure used in 3GPP LTE/LTE-A system;

FIG. 4 is a diagram for an example of a UL subframe structure used in 3GPP LTE/LTE-A system;

FIG. 5 illustrates a decrease in the length of a TTI according to reduction in user-plane latency;

FIG. 6 illustrates an example of configuring a plurality of short TTIs in one subframe;

FIG. 7 illustrates the structures of DL subframes including short TTIs of multiple lengths (various numbers of symbols);

FIG. 8 illustrates the structures of DL subframes including short TTIs of 2 and 3 symbols;

FIG. 9 is a diagram illustrating a self-contained subframe structure applicable to the present disclosure;

FIG. 10 is a diagram illustrating overlap between a control channel and another channel according to an embodiment of the present disclosure.

FIG. 11 is a conceptual view illustrating a method according to an embodiment of the present disclosure; and FIG. 12 is a block diagram showing an apparatus for embodying embodiment(s) of the present disclosure.

BEST MODE FOR CARRYING OUT THE DISCLOSURE

Reference will now be made in detail to the preferred embodiments of the present disclosure, examples of which are illustrated in the accompanying drawings. The accompanying drawings illustrate exemplary embodiments of the present disclosure and provide a more detailed description of the present disclosure. However, the scope of the present disclosure should not be limited thereto.

In some cases, to prevent the concept of the present disclosure from being ambiguous, structures and apparatuses of the known art will be omitted or will be shown in the form of a block diagram based on main functions of each structure and apparatus. Also, wherever possible, the same reference numbers will be used throughout the drawings and the specification to refer to the same or like parts.

In the present disclosure, a user equipment (UE) is fixed or mobile. The UE is a device that transmits and receives user data and/or control information by communicating with a base station (BS). The term 'UE' may be replaced with 'terminal equipment', 'mobile station (MS)', 'mobile terminal (MT)', 'user terminal (UT)', 'subscriber station (SS)', 'wireless device', 'personal digital assistant (PDA)', 'wireless modem', 'handheld device', etc. A BS is typically a fixed station that communicates with a UE and/or another BS. The BS exchanges data and control information with a UE and another BS. The term 'BS' may be replaced with 'advanced base station (ABS)', 'Node B', 'evolved-Node B (eNB)', 'base transceiver system (BTS)', 'access point (AP)', 'processing server (PS)', etc. In the following description, BS is commonly called eNB.

In the present disclosure, a node refers to a fixed point capable of transmitting/receiving a radio signal to/from a UE by communication with the UE. Various eNBs may be used as nodes. For example, a node may be a BS, NB, eNB, pico-cell eNB (PeNB), home eNB (HeNB), relay, repeater, etc. Furthermore, a node may not be an eNB. For example, a node may be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB may be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes may be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system may be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present disclosure, which will be described below, one or more eNBs or eNB controllers connected to plural nodes may control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present disclosure with respect to a method of performing coordinated data transmission using some or all nodes may be applied to various types of multi-node systems. For example, a node refers to an antenna group spaced apart from another node by a predetermined distance or more, in general. However, embodiments of the present disclosure, which will be described below, may even be applied to a case in which a node refers to an arbitrary antenna group irrespective of node interval. In the case of an eNB including an X-pole (cross polarized) antenna, for example, the embodiments of the preset disclosure are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink (DL) signal is discriminated from a node transmitting an UL signal is called multi-eNB MIMO or coordinated multi-point Tx/Rx (CoMP). Coordinated transmission schemes from among CoMP communication schemes may be categorized into joint processing (JP) and scheduling coordination. The former may be divided into joint transmission (JT)/joint reception (JR) and dynamic point selection (DPS) and the latter may be divided into coordinated scheduling (CS) and coordinated beamforming (CB). DPS may be called dynamic cell selection (DCS). When JP is performed, more various communication environments may be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability may be improved according to transmit diversity since the same stream is transmitted from/to plural nodes. DPS refers to a communication scheme by which a signal is transmitted/received through a node selected from plural nodes according to a specific rule. In the case of DPS, signal transmission reliability may be improved because a node having a good channel state between the node and a UE is selected as a communication node.

In the present disclosure, a cell refers to a specific geographical area in which one or more nodes provide communication services. Accordingly, communication with a specific cell may mean communication with an eNB or a node providing communication services to the specific cell. A DL/UL signal of a specific cell refers to a DL/UL signal from/to an eNB or a node providing communication services to the specific cell. A cell providing UL/DL communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE may measure DL channel state from a specific node using one or more channel state information reference signals (CSI-RSs) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present disclosure, physical DL control channel (PDCCH)/physical control format indicator channel (PCFICH)/physical hybrid automatic repeat request indicator channel (PHICH)/physical DL shared channel (PDSCH) refer to a set of time-frequency resources or resource elements (REs) respectively carrying DL control information (DCI)/control format indicator (CFI)/acknowledgement/negative acknowledgement (DL ACK/NACK)/DL data. In addition, physical uplink control channel (PUCCH)/physical uplink shared channel (PUSCH)/physical random access channel (PRACH) refer to sets of time-frequency resources or REs respectively carrying uplink control information (UCI)/UL data/random access signals. In the present disclosure, a time-frequency resource or an RE, which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of UL control information/UL data/random access signal through or on PUCCH/PUSCH/PRACH. Furthermore, transmission of PDCCH/PCFICH/PHICH/PDSCH by an eNB is equivalent to transmission of DL data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame may be sequentially numbered from 0 to 19. Each slot has a length of 0.5 ms. A time for transmitting a subframe is defined as a transmission time interval (TTI). Time resources may be discriminated by a radio frame number (or radio frame index), subframe number (or subframe index) and a slot number (or slot index).

The radio frame may be configured differently according to duplex mode. Downlink transmission is discriminated from UL transmission by frequency in FDD mode, and thus the radio frame includes only one of a DL subframe and an UL subframe in a specific frequency band. In TDD mode, DL transmission is discriminated from UL transmission by time, and thus the radio frame includes both a DL subframe and an UL subframe in a specific frequency band.

Table 1 shows DL-UL configurations of subframes in a radio frame in the TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes an UL subframe and S denotes a special subframe. The special subframe includes three fields of DwPTS (Downlink Pilot Time Slot), GP (Guard Period), and UpPTS (Uplink Pilot Time Slot). DwPTS is a period reserved for DL transmission and UpPTS is a period reserved for UL transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | | |
| 5 | $6592 \cdot T_s$ | $4384 \cdot T_s$ | $5120 \cdot T_s$ | $20480 \cdot T_s$ | $4384 \cdot T_s$ | $5120 \cdot T_s$ |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

FIG. 2 illustrates an exemplary DL/UL slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a DL slot and $N_{RB}^{UL}$ denotes the number of RBs in an UL slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the DL slot and $N_{symb}^{UL}$ denotes the number of OFDM symbols in the UL slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present disclosure may be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types may be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called an RE or a tone. Accordingly, an RB is composed of $N_{symb}^{DL/UL} * N_{sc}^{RB}$ REs. Each RE in a resource grid may be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

FIG. 3 illustrates a DL subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a PDSCH is allocated. A resource region available for PDSCH transmission in the DL subframe is referred to as a PDSCH region hereinafter. Examples of DL control channels used in 3GPP LTE include a PCFICH, a PDCCH, a PHICH, etc. The PCFICH is transmitted at a first OFDM symbol of a subframe and carries information regarding the number of OFDM symbols used for transmission of control channels within the subframe. The PHICH is a response of UL transmission and carries an HARQ ACK/NACK signal.

Control information carried on the PDCCH is called DL control information (DCI). The DCI contains resource allocation information and control information for a UE or a UE group. For example, the DCI includes a transport format and resource allocation information of a DL shared channel (DL-SCH), a transport format and resource allocation information of an UL shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), DL assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for UL and formats 1, 1A, 1B, 1C, 1D, 2, 2A, 2B, 2C, 3 and 3A for DL, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, the DCI format for a UE depends on the transmission mode (TM) configured for the UE. In other words, only a DCI format corresponding to a specific TM may be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH may be located for each UE. A CCE set from which a UE may detect a PDCCH thereof is called a PDCCH search space, simply, search space. An individual resource through which the PDCCH may be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Type | Search space $S_k^{(L)}$ | | Number of PDCCH candidates $M^{(L)}$ |
| --- | --- | --- | --- |
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate in a search space, and a UE monitors the search space to detect the PDCCH (DCI). Here, monitoring refers to attempting to decode each PDCCH in the corresponding search space according to all monitored DCI formats. The UE may detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB may transmit data for a UE or a UE group through the data region. Data transmitted through the data region may be called user data. For transmission of the user data, a PDSCH may be allocated to the data region. A PCH and DL-SCH are transmitted through the PDSCH. The UE may read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

An RS to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of DL data for a specific UE is called a UE-specific RS. Both or one of DM RS and CRS may be transmitted on DL. When only the DM RS is transmitted without CRS, an RS for channel measurement needs to be additionally provided because the DM RS transmitted using the same precoder as used for data may be used for demodulation only. For example, in 3GPP LTE(-A), CSI-RS corresponding to an additional RS for measurement is transmitted to the LTE such that the UE may measure channel state information. CSI-RS is transmitted in each transmission period corresponding to a plurality of subframes based on the fact that channel state variation with time is not large, unlike CRS transmitted per subframe.

FIG. 4 illustrates an exemplary UL subframe structure used in 3GPP LTE/LTE-A.

Referring to FIG. 4, a UL subframe may be divided into a control region and a data region in the frequency domain. One or more PUCCHs may be allocated to the control region to carry UCI. One or more PUSCHs may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH may be used to transmit the following control information.

Scheduling Request (SR): This is information used to request a UL-SCH resource and is transmitted using On-Off Keying (OOK) scheme HARQ ACK/NACK: This is a response signal to a DL data packet on a PDSCH and indicates whether the DL data packet has been successfully received. A 1-bit ACK/NACK signal is transmitted as a response to a single DL codeword and a 2-bit ACK/NACK signal is transmitted as a response to two DL codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK Channel State Indicator (CSI): This is feedback information about a DL channel. Feedback information regarding MIMO includes a rank indicator (RI) and a precoding matrix indicator (PMI).

The quantity of control information (UCI) that a UE may transmit through a subframe depends on the number of single carrier frequency division multiple access (SC-FDMA) symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A (exist or absent) | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK ACK/NACK or SR +ACK/NACK | Normal CP only or |
| 3 | QPSK | 48 | CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

PUCCH format 3 uses block spreading. Block spreading is a technique of multiplexing modulation symbol sequences obtained by modulating a multi-bit ACK/NACK by using block spreading codes. For block spreading, SC-FDMA may be used. SC-FDMA refers to a transmission scheme in which discrete Fourier transform (DFT) spreading (or fast Fourier transform (FFT)) is accompanied by inverse fast Fourier transform (IFFT).

In PUCCH format 3, a symbol sequence (e.g., an ACK/NACK symbol sequence) is spread in the time domain by a block spreading code, for transmission. A block spreading code may be an orthogonal cover code (OCC). Control signals from multiple UEs may be multiplexed by block spreading codes. Compared to PUCCH format 2 in which one symbol sequence is transmitted across a time area and UEs are multiplexed by using cyclic shifts (CSs) of a constant amplitude zero auto-correlation (CAZAC) sequence, a symbol sequence including one or more symbols is transmitted across a frequency area in each data symbol and UEs are multiplexed by spreading symbol sequences with block spreading codes in the time domain in PUCCH format 3.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver may receive a correct signal only when the receiver is aware of a channel state between each transmit antenna and each receive antenna. Accordingly, a reference signal needs to be provided per transmit antenna, more specifically, per antenna port.

Reference signals may be classified into an UL reference signal and a DL reference signal. In LTE, the UL reference signal includes:

i) a demodulation reference signal (DMRS) for channel estimation for coherent demodulation of information transmitted through a PUSCH and a PUCCH; and ii) a sounding reference signal (SRS) used for an eNB to measure UL channel quality at a frequency of a different network.

The DL reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a DL DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals may be classified into a reference signal for channel information acquisition and a reference signal for data demodulation. The former needs to be transmitted in a wide band as it is used for a UE to acquire channel information on DL transmission and received by a UE even if the UE does not receive DL data in a specific subframe. This reference signal is used even in a handover situation. The latter is transmitted along with a corresponding resource by an eNB when the eNB transmits a DL signal and is used for a UE to demodulate data through channel measurement. This reference signal needs to be transmitted in a region in which data is transmitted.

Carrier Aggregation (CA)

CA refers to a method in which a UE uses a plurality of frequency blocks or cells (of logical meaning) including UL resources (or component carriers) and/or DL resources (or component carriers) as one large logical frequency band so that a wireless communication system may use a wider frequency band.

An LTE system uses one DL component carrier and one UL component carrier, whereas an LTE-A system may use multiple component carriers. In this case, a scheme in which a control channel schedules a data channel may be divided into existing linked or self-carrier scheduling and cross-carrier scheduling (CCS).

More specifically, in the linked/self-carrier scheduling, the control channel transmitted on a specific component carrier schedules only the data channel on the specific component carrier as in the legacy LTE system using a single component carrier.

In contrast, in the cross-carrier scheduling, the control channel transmitted on a primary component carrier schedules the data channel transmitted on the primary component carrier or another component carrier using a carrier indicator field (CIF).

Next-Generation LTE-A System

As more and more communication devices require a larger communication capacity, there is a need for enhanced mobile broadband communication (eMBB) beyond the legacy radio access technology (RAT) in a next-generation communication system under discussion. In addition, massive machine type communications (MTC) that provide a variety of services anywhere and anytime by interconnecting multiple devices and objects is one of important issues to be considered for next-generation communications. In consideration of services/UEs sensitive to reliability and latency, ultra-reliable and low latency communication (URLLC) is being discussed for the next-generation communication system.

In the next-generation system, various (lengths of) transmission time intervals (TTIs) may be configured for all or specific physical channels to satisfy the requirements of various application fields. In particular, a TTI in which a physical channel such as a PDCCH/PDSCH/PUSCH/PUCCH is transmitted may be set less than 1 msec to reduce communication latency between an eNB and a UE depending on scenarios (the PDCCH/PDSCH/PUSCH/PUCCH is referred to as a sPDCCH/sPDSCH/sPUSCH/sPUCCH). For a single or multiple UEs, a plurality of physical channels may be present in one subframe (e.g., 1 msec), and each channel may have a different TTI (length). The following embodiments will be described based on the LTE system for convenience of description. In this case, a TTI may be set to 1 msec, which is the length of a normal subframe of the LTE system (such a TTI is referred to as a normal TTI). A short TTI means a TTI shorter than the normal TTI and includes one or multiple OFDM or SC-FDMA symbols. Although the present disclosure assumes the short TTI (i.e., a TTI shorter than one subframe) for convenience of description, the present disclosure may be extended and applied when the TTI is longer than one subframe or has a length equal to or longer than 1 ms. The present disclosure may also be extended and applied when the next-generation system introduces the short TTI by increasing the subcarrier spacing. Although the present disclosure is described based on the LTE system for convenience of description, the disclosure is also applicable to a technology that uses a different waveform/frame structure such as new radio access technology (RAT). In general, the present disclosure assumes the use of a sTTI (<1 msec), a long TTI (=1 msec), and a longer TTI (>1 msec). Although the following embodiments are described based on multiple UL channels having different TTI lengths, numerologies, and/or processing times, it is apparent that the embodiments are applicable to multiple UL/DL channels with different service requirements, latency, and/or scheduling units.

To satisfy a reduction in the above-described latency, i.e., low latency, a TTI, which is a minimum unit for data transmission, needs to be newly designed to be reduced to a shortened TTI (sTTI) which is equal to or less than 0.5 msec (ms). For example, as illustrated in FIG. 5, in order to reduce user-plane (U-plane) latency to 1 ms until the UE completes transmission of ACK/NACK (A/N) since the eNB has started transmission of data (a PDCCH and a PDSCH), the sTTI may be configured in units of about 3 OFDM symbols.

In a DL environment, a PDCCH for data transmission/scheduling within the sTTI (i.e., a sPDCCH) and a PDSCH for transmitting data within the sTTI (i.e., sPDSCH) may be transmitted. For example, as illustrated in FIG. 6, a plurality of sTTIs may be configured using different OFDM symbols in one subframe. Characteristically, OFDM symbols in which legacy channels are transmitted may be excluded from OFDM symbols constituting a sTTI. The sPDCCH and the sPDSCH within the sTTI may be transmitted in different OFDM symbol regions by being time-division-multiplexed (TDMed) or may be transmitted in different PRBs or on different frequency resources by being frequency-division-multiplexed (FDMed).

In a UL environment, data may be transmitted/scheduled in the sTTI as in the DL case. In this case, channels corresponding to the PUCCH and the PUSCH, which are based on the normal TTI, may be referred to as 'sPUCCH' and 'sPUSCH', respectively.

In the present disclosure, a description is given based on an LTE/LTE-A system. In a legacy LTE/LTE-A system, a 1-ms subframe may include 14 OFDM symbols in the case of a normal CP. If the 1-ms subframe is configured by TTIs shorter than 1 ms, one subframe may include a plurality of TTIs. As in examples illustrated in FIG. 7, 2 symbols, 3 symbols, 4 symbols, or 7 symbols may constitute one TTI. Although not illustrated, the case in which one symbol constitutes one TTI may be considered. If one symbol constitutes one TTI unit, 12 TTIs are generated under the assumption that legacy PDCCHs are transmitted in two OFDM symbols. Similarly, as illustrated in (a) of FIG. 7, if two symbols constitute one TTI unit, 6 TTIs may be generated. As illustrated in (b) of FIG. 7, if 3 symbols constitute one TTI unit, 4 TTIs may be generated. As illustrated in (c) of FIG. 7, if 4 symbols constitute one TTI unit, 3 TTIs may be generated. In this case, it is assumed that legacy PDCCHs are transmitted in the first starting two OFDM symbols.

As illustrated in (d) of FIG. 7, in the case in which 7 symbols constitute one TTI, 7 symbols including legacy PDCCHs may constitute one TTI and 7 subsequent symbols may constitute one TTI. If one TTI includes 7 symbols, a UE supporting a sTTI assumes that, in a TTI located at a front part of one subframe (i.e., the first slot), front two OFDM symbols in which legacy PDCCHs are transmitted are punctured or rate-matched and that data of the UE and/or control information is transmitted in 5 symbols subsequent to the front two symbols. In contrast, the UE assumes that, in a TTI located at a rear part of one subframe (i.e., the second slot), data and/or control information may be transmitted in all of 7 symbols without a punctured or rate-matched resource region.

The present disclosure considers a sTTI structure in which a sTTI consisting of two OFDM symbols (OSs) and a sTTI consisting of three OSs coexist in one subframe as illustrated in FIG. 8. The sTTI consisting of two or three OSs may be simply defined as a two-symbol sTTI (or a two-OS sTTI). In addition, a two-symbol sTTI and a three-symbol MI may be referred to as a two-symbol TTI and a three-symbol TTI, respectively. It should be noted that each of the sTTIs is shorter than the legacy TTI, i.e., 1 ms TTI. That is, the term "TTI" used herein may indicate the sTTI as well. The object of the present disclosure is to provide a communication method in a system using a TTI shorter than the legacy TTI, irrespective of their names.

Herein, the numerology may refer to a TTI length or subcarrier spacing to be applied to a wireless communication system, a parameter indicating a fixed TTI length or fixed subcarrier spacing, a communication architecture or system based thereon.

In sTTI pattern <3,2,2,2,2,3> illustrated in FIG. 8 (a), the sPDCCH may be transmitted depending on the number of PDCCH symbols. In sTTI pattern <2,3,2,2,2,3> illustrated in FIG. 8 (b), it may be difficult to transmit the sPDCCH due to the legacy PDCCH region.

New Radio Technology (NR)

The structure, operations, or functions of the 3GPP LTE (-A) system have been described above. For NR, the structure, operations, or functions of the 3GPP LTE(-A) system may be modified to a certain extent or realized or configured in a different manner, which will be described in brief.

In the NR system, a DL transmission and a UL transmission are performed in 10-ms frames each including 10 subframes. Accordingly, one subframe is 1 ms long. Each frame is divided into two half-frames.

One subframe includes as many consecutive OFDM symbols as $N_{symb}^{subframe,\mu}$ ($=N_{symb}^{slot} \times N_{slot}^{subframe,\mu}$) where $N_{symb}^{slot}$ represents the number of symbols per slot, $\mu$ represents an OFDM numerology, and $N_{slot}^{subframe,\mu}$ represents the number of slots per subframe with respect to $\mu$. In NR, multiple OFDM numerologies may be supported as listed in Table 5.

TABLE 5

| $\mu$ | $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In Table 5, $\Delta f$ represents a subcarrier spacing (SCS). $\mu$ and a cyclic prefix (CP) for a DL carrier bandwidth part (BWP) and $\mu$ and a CP for a UL carrier BWP may be configured for a UE by UL signaling.

Table 6 lists the number of symbols per slot, $N_{symb}^{slot}$, the number of slots per frame, $N_{slot}^{frame,\mu}$, and the number of slots per subframe, $N_{slot}^{subframe,\mu}$, for each SCS in a normal CP case.

TABLE 6

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Table 7 lists the number of symbols per slot, $N_{symb}^{slot}$, the number of slots per frame, $N_{slot}^{frame,\mu}$, and the number of slots per subframe, $N_{slot}^{subframe,\mu}$, for each SCS in an extended CP case.

TABLE 7

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

As such, the number of slots per subframe may vary according to an SCS in the NR system. Each of the OFDM symbols of each slot may correspond to one of DL (D), UL (U), and flexible (X). A DL transmission may take place in a D or X symbol, and a UL transmission may take place in a U or X symbol. Flexible resources (e.g., an X symbol) may also be referred to as reserved resources, other resources, or unknown resources.

In NR, one RB is defined by 12 subcarriers in the frequency domain. One RB may include multiple OFDM symbols. An RE is defined by one subcarrier by one OFDM symbol. Therefore, there are 12 REs in one OFDM symbol of one RB.

A carrier BWP may be defined as a set of contiguous PRBs. The term carrier BWP may also be referred to shortly as BWP. Up to four BWPs may be configured for a UE on each of UL and DL. Although multiple BWPs are configured, one BWP is activated during a given time period. However, when a supplementary UL (SUL) is configured for the UE, four more BWPs may be configured on the SUL, and one of the BWPs may be activated during a given time period. The UE does not expect to receive a PDSCH, a PDCCH, a CSI-RS, or a tracking reference signal (TRS) outside the activated DL BWP. Further, the UE does not expect to receive a PUSCH or a PUCCH outside the activated UL BWP.

FIG. 9 is a diagram illustrating a self-contained subframe structure applicable to the present disclosure.

In FIG. 9, the hatched area (e.g., symbol index=0) represents a DL control region, and the black area (e.g., symbol index=13) represents a UL control region. The other area (e.g., symbol index=1 to 12) may be used for DL or UL data transmission.

Based on the self-contained slot structure, a BS and a UE may sequentially perform DL transmission and UL transmission in one slot. That is, the BS and the UE may transmit and receive not only DL data but also UL ACK/NACK for the DL data in one slot. The self-contained slot structure may reduce a time required for data retransmission when a data transmission error occurs, thereby minimizing the latency of the final data transmission.

In the self-contained slot structure, a time gap with a predetermined length is required to allow the BS and the UE to switch from transmission mode to reception mode or vice versa. To this end, some OFDM symbols at the time of switching from DL to UL may set as a guard period (GP).

Although it is described that the self-contained slot structure includes both the DL and UL control regions, these control regions may be selectively included in the self-contained slot structure. In other words, the self-contained slot structure according to the present disclosure may include either the DL control region or the UL control region as well as both the DL and UL control regions as shown in FIG. 7.

For example, a slot may have various slot formats. In this case, OFDM symbols in each slot can be classified into a DL symbol (denoted by 'D'), a flexible symbol (denoted by 'X'), and a UL symbol (denoted by 'U').

Thus, a UE may assume that DL transmission occurs only in symbols denoted by 'D' and 'X' in a DL slot. Similarly, the UE may assume that UL transmission occurs only in symbols denoted by 'U' and 'X' in a UL slot.

Collision Handling for Same TTI Length/Different Requirements

One or more UL data channels or one or more UL control channels may have specific requirements per channel. The requirements may relate to one or more of a target service, quality of service (QoS), block error rate (BLER), transmission reliability, transmission latency, and processing time. One or more of the requirements may be considered or configured with respect to a specific channel. When a plurality of channels is configured for the UE or the BS, requirements may differ according to each channel.

For example, a specific UL channel configured for the UE may have a first requirement indicating that a user plane latency time should be within 0.5 ms and a second requirement indicating that data of a specific size should be transmitted at a BLER of $10^{-5}$ or less within 1 ms. Another UL channel configured for the UE may have only a requirement indicating that data of a specific size should be transmitted at a BLER of $10^{-1}$ or less within 1 ms.

One or more requirements per channel may be configured by the BS through a higher layer signal. The BS may explicitly indicate requirements per channel through DCI for data scheduling. Alternatively, upon receiving a PDCCH for data scheduling, the UE may identify the requirements through a search space (SS) to which the PDCCH belongs, through a control resource set (CORESET) to which the PDCCH belongs, or through a DCI format of the PDCCH. The UE may also identify the requirements through an RNTI used for CRC masking for the PDCCH or based on CRC masking itself.

When multiple UL channels that the UE should transmit have different requirements, resources on which the multiple channels are to be transmitted may overlap. In the present application, the case in which the multiple channels overlap includes the case in which the entirety or part of resource regions in which the multiple channels are transmitted are equal only in the time domain rather than in the frequency domain.

Hereinafter, when multiple channels overlap, different UL transmission methods will be defined according to whether the channels are located on the same carrier or different carriers. Hereinafter, overlap between the multiple channels will also be expressed as collision between the multiple channels.

Collision may occur between multiple UL channels with the same TTI length and/or numerology. The multiple UL channels with the same TTI length and/or numerology may have different requirements.

Collision may occur between multiple PUSCHs, between multiple PUCCHs, or between a PUSCH and a PUCCH. In addition, collision between UL channels described in the present application includes not only collision between multiple channels with different requirements but also the case in which collision occurs due to transmission of multiple UCIs with different requirements on one PUCCH and the case in which UCI and a PUSCH have different requirements when the UCI is piggybacked on the PUSCH.

First, the case in which collision occurs between UL channels on the same carrier will now be described.

Even when collision occurs between a PUSCH and a PUCCH on the same carrier, the UE supporting simultaneous transmission of the PUCCH and the PUSCH may simultaneously transmit the two channels. In contrast, when the UE is incapable of performing simultaneous transmission of the PUCCH and the PUSCH, UCI to be transmitted through the PUCCH may be piggybacked on the PUSCH. When the UCI has a stricter requirement than the PUSCH (e.g., when the UCI is requested to have lower latency/higher reliability or lower BLER than the PUSCH), the following description may be considered upon mapping the UCI to the PUSCH.

Multiple UCIs with stricter requirements than the PUSCH may be mapped to the PUSCH and a resource allocated to the PUSCH may be insufficient to map all the multiple UCIs to the PUSCH. When requirements differ between the multiple UCIs, the UE may map the UCIs to the PUSCH resource by prioritizing UCI with a relatively strict requirement over UCI with a relatively weak requirement. Thus, even when the PUSCH resource is insufficient, the UCI with a weaker requirement may be lost so that the loss of the UCI with a stricter requirement may be minimized.

The UE may also prioritize mapping of the UCI with the relatively weak requirement over mapping of the UCI with the relatively strict requirement to the PUSCH resource. When piggyback is performed, UCI is preferentially mapped to a symbol boundary of the PUSCH resource, and the symbol boundary is more greatly affected by a power transient period than other parts. The UE may first map the UCI with the relatively weak requirement to the PUSCH resource and then map the UCI with the relatively strict requirement to the PUSCH resource, so that the UCI with a stricter requirement may not be mapped to the symbol boundary. Thus, the UCI with the stricter requirement may be protected.

Alternatively, the UE may determine UCI to be first mapped in consideration of both the amount of resource allocation of the PUSCH and the power transient period. For example, when the PUSCH resource is insufficient to map two UCIs, UCI with a relatively strict requirement is first mapped to the PUSCH resource and, when the PUSCH resource is sufficient to map the two UCIs, UCI with a relatively weak requirement may be first mapped to the PUSCH resource.

Alternatively, information as to which UCI the UE should first map may be configured/indicated by the BS through a higher-layer signal or a physical layer signal.

Alternatively, whether each UCI is transmitted to the UE may be predefined. For example, whether UCI with a relatively strict requirement is transmitted may be predefined for the UE. Whether UCI is transmitted may be defined in consideration of the number of REs to which UCI is to be mapped, the number of REs to which UCI is not to be mapped and on which UCI is to be dropped, and/or the code rate of UCI. Alternatively, the BS may define transmission or non-transmission of each UCI by the UE and configure/indicate the defined transmission or non-transmission for/to the UE. In this case, the BS may consider the number of REs to which UCI is to be mapped, the number of REs to which UCI is not to be mapped and on which UCI is to be dropped, and/or the code rate of UCI.

The above-described methods may be applied to the case in which multiple UCIs with different requirements are transmitted on one PUCCH as well as the case in which multiple UCIs are piggybacked on one PUSCH and then transmitted. In addition, the above-described methods may also be applied to the case in which requirements differ between UCI piggybacked on the PUSCH due to collision with the PUSCH in a state in which the UCI has been configured to be transmitted on the PUCCH and UCI initially configured to be piggybacked on the PUSCH.

Collision may occur between UL channels on different carriers.

When collision occurs between UL channels on different carriers, there may be no problems if the UE is capable of transmitting multiple UL channels. However, when the transmit power of the UE is limited, the UE needs to control the power of the multiple UL channels.

Conventionally, whether power reduction is applied has been determined in consideration of the following priorities.
PUCCH>PUSCH on which UCI is piggybacked>PUSCH without UCI
HARQ ACK/SR>CSI>data>SRS
Lower cell index>higher cell index A signal or channel positioned on the right has a lower priority and power reduction is first applied to the signal or channel having the lower priority.

If the UE needs to transmit an eMBB PUSCH (a channel with a relatively weak requirement) on which UCI is piggybacked and a URLLC PUSCH (a channel with a relatively strict requirement) without UCI on different carriers, the UE first reduces the power of the URLLC PUSCH according to the conventional priority.

When taking into account a target and a requirement to be achieved through URLLC, it is not desirable for the UE to first reduce the power of the URLLC PUSCH.

Hereinafter, the operation of the UE is proposed when multiple UL channels with different requirements are transmitted on different carriers.

First, the UE may determine a channel, power of which is to be reduced, by preferentially considering a requirement per UL channel as compared with a conventional criterion or a priority of UCI. For example, the UE may assign a higher priority to a channel with a relatively strict requirement and perform power reduction first upon a channel with a relatively weak requirement.

If the proposed method is applied, even though UCI is not piggybacked on the URLLC PUSCH in the afore-described example, a higher priority is assigned to the URLLC PUSCH as compared with the PUSCH on which the UCI is piggybacked. The UE first reduces the power of the PUSCH on which the UCI is piggybacked.

The power reduction operation may be an operation of reducing the transmit power of a specific channel such that the total transmit power that the UE is to use for transmission of UL channels is less than a predetermined power (e.g., a maximum power Pcmax configured for the UE).

Alternatively, the UE may determine a channel on which UCI is to be transmitted in consideration of a requirement per channel. For example, when both an eMBB PUSCH with a relatively low cell index and a URLLC PUSCH with a relatively high cell index are scheduled, the UE may piggyback UCI on the URLLC PUSCH among the two PUSCHs. Even when the UE supports simultaneous transmission of a PUCCH and a PUSCH, if the requirement of the PUSCH is stricter than that of the PUCCH, the UE may piggyback UCI included in the PUCCH on the PUSCH and drop (or stop) the PUCCH.

Alternatively, the UE may determine a channel on which UCI is to be transmitted in consideration of a requirement per UCI and a requirement per channel. For example, when the UE transmits HARQ-ACK for the eMBB PDSCH, if a PUCCH on which HARQ-ACK is to be transmitted collides with the eMBB PUSCH, the UE may map HARQ-ACK to an eMBB PUSCH resource. If a PUCCH on which HARQ-ACK for the eMBB PDSCH is to be transmitted collides with the URLLC PUSCH, the UE may not map HARQ-ACK to the URLLC PUSCH. Similarly, if a PUCCH on which HARQ-ACK for the URLLC PDSCH is to be transmitted collides with the URLLC PUSCH, the UE may map HARQ-ACK to the URLLC PUSCH resource.

Alternatively, when power limitation of the UE is problematic, the UE may differently configure the amount of power reduction with respect to each channel with a different requirement. For example, the UE may configure the amount of power reduction of a channel with a relatively strict requirement to be smaller than the amount of power reduction of a channel with a relatively weak requirement. The BS may also transmit information about the amount of power reduction per channel to the UE through a higher layer signal. The information about the amount of power reduction per channel may be given as the ratio of power reduction per channel. Alternatively, the information about power reduction per channel may be given as an offset of the amount of power reduction of a channel with a strict/weak requirement relative to a specific channel. For example, the UE may configure the ratio of power reduction of the URLLC PUSCH to the eMBB PUSCH as 1:1.5. Alternatively, the amount of power reduction per channel may be determined in consideration of code rate and/or resource allocation.

Collision Handling for Different TTI Lengths/Different Requirements

Collision may occur between multiple UL channels with different TTI lengths and/or numerologies. The UL channels with different TTI lengths and/or numerologies may have different requirements.

When UL channels have different TTI lengths, collision may occur between a PUSCH with a longer TTI and an sPUSCH with a shorter TTI, between a PUCCH and an sPUCCH, between a PUSCH and an sPUCCH, or between a PUCCH and an sPUSCH.

First, the case in which collision occurs between UL channels on the same carrier will now be described.

When the TTL length of a URLLC channel is shorter than the TTL length of an eMBB channel, the UE may transmit HARQ-ACK for an eMBB PDSCH on the URLLC channel.

However, it may be necessary to drop HARQ-ACK for the eMBB PDSCH without transmission in order to secure the requirement of the URLLC channel. Specifically, whether HARQ-ACK for the eMBB PDSCH is to be piggybacked on the URLLC channel according to the channel type of the URLLC channel may be determined. For example, when the URLLC channel is a URLLC PUSCH, the UE may permit HARQ-ACK for the eMBB PDSCH to be piggybacked and, when the URLLC channel is the URLLC PUCCH, the UE may not permit HARQ-ACK for the eMBB PDSCH to be piggybacked.

The UE may consider performance degradation caused by performing puncturing when HARQ-ACK is piggybacked on the URLLC PUSCH. When the URLLC channel is the URLLC PUSCH, the UE may not permit HARQ-ACK for the eMBB PDSCH to be piggybacked and, when the URLLC channel is the URLLC PUCCH, the UE may permit HARQ-ACK for the URLLC PUCCH in the case in which only bit increase to a degree of not affecting Reed-Muller (RM) coding performance is permitted.

Alternatively, the UE may determine whether to permit piggyback on the eMBB channel in consideration of a PUCCH format (including an sPUCCH format) of the URLLC PUCCH. When the PUCCH format of the URLLC PUCCH is format 1a/1b etc., HARQ-ACK is transmitted based on a channel selection scheme. If HARQ-ACK for the eMBB PDSCH is added, a format or performance may need to be changed. Considering this issue, the UE may not permit HARQ-ACK to be piggybacked when the PUCCH format of the URLLC PUCCH is format 1a/1b etc. When the PUCCH format of the URLLC PUCCH is format 3/4 etc., the UE may permit HARQ-ACK for the eMBB PDSCH to be piggybacked.

Alternatively, the UE may determine whether to permit HARQ for the eMBB PDSCH to be piggybacked in consideration of resource use of the URLLC PUSCH. For example, the UE may determine whether to permit HARQ-ACK for the eMBB PDSCH to be piggybacked by considering whether the URLLC PUSCH has a specific MCS index or less. The UE may consider whether the URLLC PUSCH includes RBs of a specific number or more and consider whether the transmit power of the URLLC PUSCH is a threshold value or more. The UE may individually consider conditions related to the URLLC PUSCH and permit HARQ-ACK for the eMBB PDSCH to be piggybacked when one condition is satisfied. Alternatively, the UE may combine a plurality of conditions and permit HARQ-ACK for the eMBB PDSCH to be piggybacked only when all of the combined conditions are satisfied.

Even when multiple UL channels with different TTI lengths and/or numerologies are located on different carriers, respectively, collision between UL channels may occur.

When multiple UL channels with different TTI lengths and/or numerologies are located on different carriers, respectively, whether the UE may simultaneously transmit the multiple UL channels are generally determined according to a radio frequency (RF) chain configuration of the UE.

Conventionally, whether the UE is capable of simultaneously transmitting multiple UL channels with different TTI lengths on different carriers has been defined as UE capability and the UE has been supposed to report the UE capability to a network. However, when the transmit power of the UE is limited, the UE needs to perform power control for the multiple UL channels. Drop of a specific channel may be performed separately or together with power control. When power control and/or dropping is performed upon the specific channel, requirements of channels upon which power control and/or dropping is to be performed may be considered. When the specific channel is dropped, UCI of the channel to be dropped may be piggybacked on another channel. The UE may determine a channel on which the UCI is to be piggybacked in consideration of requirements of the UCI or channels on which the UCI is to be piggybacked.

Meanwhile, when the UE is incapable of simultaneously transmitting multiple UL channels with different TTI lengths on different carriers, channels with a relatively long TTI length have conventionally been dropped. For example, 4 cells may be configured for the UE as follows.

Cell 1: URLLC PUCCH
Cell 2: URLLC PUSCH
Cell 3: eMBB sPUSCH
Cell 4: URLLC sPUSCH Conventionally, channels of cell 1 and cell 2 with a relatively long TTI have been dropped and UCI of the URLLC PUCCH of cell 1 has been piggybacked on the eMBB sPUSCH of cell 3 with a lower cell index. This may not guarantee requirements necessary for the UCI because the UCI is piggybacked on the eMBB channel with a weak requirement relative to the URLLC PUCCH.

Considering this issue, if the TTI lengths of multiple channels on which UCI is to be piggybacked are equal, a channel on which the UCI is to be piggybacked may be determined by first considering a priority based on requirements of the multiple channels rather than a cell index. Then, the UCI may be piggybacked on the URLLC sPUSCH of cell 4 with a relatively strict requirement rather than on the eMBB sPUSCH of cell 3.

UCI Transmission with Different Requirements

As described earlier, when multiple UL channels with different requirements overlap, partial channels may be dropped. Hereinafter, a UCI transmission method of a dropped channel will be proposed in detail. The following description may be applied even when multiple UCIs with different requirements are transmitted on one channel. In addition, as described previously, one or more requirements per UCI may be configured through a higher layer signal of the BS. The BS may explicitly indicate requirements per UCI through DCI for data scheduling. Alternatively, when the UE receives a PDCCH for data scheduling, the UE may identify requirements through an SS to which the PDCCH belongs, through a CORESET to which the PDCCH belongs, or through a DCI format of the PDCCH. The UE may also identify requirements through an RNTI used for CRC masking for the PDCCH or based on CRC masking itself.

When multiple channels with different requirements are present, UCI of a channel with a high priority (or UCI for scheduling a channel with a high priority) caused by a relatively strict requirement is piggybacked on a channel which is not dropped. UCI of a channel with a low priority (or UCI for scheduling a channel with a low priority) may be dropped without being piggybacked.

Alternatively, whether to perform piggyback may be determined according to characteristics of channels on which UCI is capable of being piggybacked. For example, a channel on which the UCI it to be piggybacked may be a channel on which repetitive transmission is performed in units of a specific time (a TTI, a slot, a symbol, a TTI group, a slot group, or a symbol group). The channel on which repetitive transmission is performed may be, for example, a semi-persistent scheduling (SPS) PUSCH.

Only part of a PUCCH in which UCI is included may overlap with a channel which is repeatedly transmitted in the time domain (Case 1 of FIG. 10). The entirety of the PUCCH in which the UCI is included may also overlap with the channel which is repeatedly transmitted in the time domain (Case 2 of FIG. 10).

When part of the PUCCH overlaps with a repeatedly transmitted channel as illustrated in Case 1 of FIG. 10, if the PUCCH is dropped and UCI of the PUCCH is piggybacked on the repeatedly transmitted channel, the UCI should be piggybacked starting from the middle of the repeatedly transmitted channel. When the UCI of the PUCCH is piggybacked on the repeatedly transmitted channel, the number of transmission bits of the UCI may differ from that when the UCI is transmitted on the PUCCH. If the number of transmission bits is changed, the transmit power of the repeatedly transmitted channel may need to be changed in the middle of repetitive transmission. This is undesirable in terms of reliability of the channel. Considering this issue, the UCI of the dropped channel may be configured not to be piggybacked on the repeatedly transmitted channel.

Alternatively, if part of a repeatedly transmitted channel overlaps with a dropped channel in the time domain so that transmission of the repeatedly transmitted channel is performed over a TTI boundary of the dropped channel, UCI of the dropped channel may be configured not to be piggybacked on the repeatedly transmitted channel. If the entirety of the repeatedly transmitted channel overlaps with the dropped channel in the time domain so that transmission of the repeatedly transmitted channel is performed within a TTI of the dropped channel, piggyback of the UCI of the dropped channel on the repeatedly transmitted channel may be permitted.

Alternatively, when multiple UCIs with different requirements are transmitted on one channel, a bit payload for UCI encoding may be determined by a configured ratio. Information about the ratio between bit payloads of the UCIs may be predefined for the UE or may be transmitted by the BS to the UE through a higher/physical layer signal. When the UE determines the ratio between bit payloads, the UE may increase or decrease the bit payload of another UCI based on a bit payload of specific UCI. For example, it is assumed that the ratio of the bit payload of HARQ-ACK for the eMBB PDSCH to the bit payload of HARQ-ACK for the URLLC PDSCH is configured as 1:2. When HARQ-ACK for the eMBB PDSCH is 4 bits and HARQ-ACK for the URLLC PDSCH is 4 bits, the UE may reduce the bit payload of HARQ-ACK for the eMBB PDSCH to 2 bits based on the bit payload of 4 bits of HARQ-ACK for the URLLC PDSCH. Bundling or truncation may be used as the bit payload reduction method. Alternatively, the UE may determine bit payloads of multiple UCIs according to the configured ratio based on total bit payloads. When the total bit payloads are 12 bits, the UE may determine the bit payload of HARQ-ACK for the URLLC PDSCH as 8 bits and the bit payload of HARQ-ACK for the eMBB PDSCH as 4 bits.

Meanwhile, when multiple UCIs with the same requirement are transmitted on one channel, joint coding may be performed upon the multiple UCIs. Alternatively, when multiple UCIs with different requirements are transmitted on one channel, separate coding and/or separate CRC attachment may be performed upon the multiple UCIs so that requirements for UCI demanding relatively strict reliability may be guaranteed.

In addition, a DAI may be separately counted per requirement so that coding/mapping for UCIs (e.g., HARQ-ACK) with different requirements may be more easily performed. The value of a DAI field may indicate the number of DL subframes in which a PDSCH is received in a specific time duration. When the number of subframes in which a URLLC PDSCH is received is 1 and the number of subframes in which an eMBB PDSCH is received is 2, the BS may configure a value for indicating 1, which is a number related to the URLLC PDSCH, and a value for indicating 2, which is a number related to the eMBB PDSCH, instead of indicating 3 as the value of the DAI field, during UL grant allocation for UCI transmission.

When UCI is piggybacked on a PUSCH, the UE should determine to how many REs among REs allocated to the PUSCH the UCI is to be mapped. If REs to which specific UCI is to be mapped increases, the transmission code rate of a UL-SCH increases so that transmission performance of the PUSCH may deteriorate. Alternatively, REs for UL-SCH transmission may be insufficient. The number of REs for UCI transmission as well as the number of REs for UL-SCH transmission may also be insufficient and transmission performance of the UCI may deteriorate.

When the UCI is piggybacked on the PUSCH, the UE calculates the number of REs to which the UCI is to be mapped. The UE may not expect that the PUSCH will be scheduled such that REs for UL-SCH transmission are insufficient to map the UCI. In other words, the UE may assume that the PUSCH will be scheduled so that REs for UL-SCH transmission may not be insufficient to map the UCI. If the REs for UL-SCH transmission are insufficient to map the UCI in the PUSCH that is scheduled for the UE, the UE may drop the entirety or part of the UCI and transmit the PUSCH.

Alternatively, when the UCI is piggybacked on the PUSCH, the UE determines whether a code rate of the UL-SCH is a threshold value or more upon calculating the number of REs to which the UCI is to be mapped. The UE may not expect that the PUSCH is scheduled such that the code rate of the UL-SCH is the threshold value or more. If the code rate of the UL-SCH is the threshold value or more in the PUSCH that is scheduled for the UE, the UE may drop one or more UCIs and transmit the PUSCH. The UE may also bundle multiple UCIs into one UCI (e.g., by performing logical operation of AND for bit values of the multiple UCIs). Then, since the code rate of the UL-SCH is less than a predetermined value, the reliability of UL transmission of the UE may be guaranteed.

Upon dropping part of UCIs, the UE may determine the order of the UCIs to be dropped in consideration of priorities of the UCIs or requirements per UCI. For example, the priorities of the UCIs may be configured in order of HARQ-ACK>RI>CQI/PMI and each requirement (high reliability, low latency, lower BLER, shorter TTI length, larger subcarrier spacing, and shorter processing time). The UE may first drop an RI having a low priority among HARQ-ACK and RI of multiple UCIs.

For a PUCCH format in which the UE should encode and map each UCI (e.g., PUCCH format 3), the UE may determine the order of UCIs to be bundled or dropped in consideration of priorities of the UCIs or requirements per UCI upon bundling and/or dropping part of the UCIs. In addition, the number of RBs to be transmitted may increase according to the number of UCIs that the UE is to transmit. The maximum number of RBs that the UE is capable of transmitting may be preset. The UE may increase the number of RBs to be used for UL channel transmission up to the maximum preset number of RBs before performing bundling and/or dropping the UCIs. Even when the UE transmits a UL channel according to the maximum preset number of RBs, the code rate of a UL-SCH may be above a threshold value. After increasing the number of RBs to be used for the UL channel up to the maximum preset number of RBs, the UE may additionally perform bundling and/or dropping of the UCIs so that the code rate of the UL-SCH is the threshold value or less.

The BS may configure, for the UE, the maximum number of RBs that the UE is capable of transmitting and the threshold value of the code rate of the UL-SCH. The BS may increase the number of RBs that the UE is to use for UL channel up to the maximum preset number of RBs and assume that multiple UCIs are transmitted on one channel after bundling and/or dropping the UCIs so that the code rate of the UL-SCH is the threshold value or less. The BS may decode a channel received from the UE based on the assumption.

A conventional equation for determining the number of coded symbols (the number of REs) to which HARQ-ACK for the PUSCH is to be mapped is as follows.

$$Q' = \min\left(\left\lceil \frac{O \cdot M_{sc}^{PUSCH-initial} \cdot N_{symb}^{PUSCH-initial} \cdot \beta_{offset}^{PUSCH}}{\sum_{r=0}^{C-1} K_r} \right\rceil, 4 \cdot M_{sc}^{PUSCH}\right) \quad \text{[Equation 1]}$$

In equation 1, $4 \cdot M_{sc}^{PUSCH}$ is a value for limiting the maximum value of Q'. $4 \cdot M_{sc}^{PUSCH}$ is obtained by multiplying 4, which is the number of SC-FDMA symbols, by the number of RBs of a PUSCH scheduled for the UE. This is because HARQ-ACK may be mapped to 4 SC-FDMA symbols.

Even for a subslot in which the number of symbols to which data is mapped in a TTI is one, multiple UCIs with different requirements may be mapped. When a maximum value of the number of coded symbols to which UCI is to be mapped is limited based on one symbol, a PUSCH resource may be insufficient to map the multiple UCIs. Considering this issue, the maximum value of the number of coded symbols to which the multiple UCIs with different requirements are to be mapped may be limited based on a value calculated by a configured ratio. The configured ratio may be predefined for the UE. The configured ratio may also be indicated to the UE by the BS through a higher layer/physical layer signal. For example, when HARQ-ACK and RI should be mapped to one symbol, it is assumed that the configured ratio is HARQ-ACK:RI=7:3. The maximum value of the number of coded symbols to which HARQ-ACK is to be mapped is limited to a value obtained by multiplying 0.7 by "the number of SC-FDMA symbols and the number of subcarriers of a scheduled PUSCH". The maximum value of coded symbols to which RI is to be mapped is limited to a value obtained by multiplying 0.3 by "the number of SC-FDMA symbols and the number of subcarriers of the scheduled PUSCH".

Alternatively, for UCI with a relatively high priority or a relatively strict requirement, the maximum value of the number of coded symbols may be limited based on one symbol. For UCI with a relatively low priority or a relatively weak requirement, UCI with a relatively high priority or a relatively strict requirement may be first mapped and the maximum value of the number of coded symbols may be limited based on the number of the remaining REs.

Specifically, HARQ-ACK may be mapped to REs located on one symbol based on Equation 2.

$$Q'_{ACK} = \min\left(\left\lceil \frac{O \cdot M_{sc}^{PUSCH-initial} \cdot N_{symb}^{PUSCH-initial} \cdot \beta_{offset}^{PUSCH}}{\sum_{r=0}^{C-1} K_r} \right\rceil, M_{sc}^{PUSCH}\right) \quad \text{[Equation 2]}$$

Next, RI may be mapped to REs located on one symbol based on Equation 3 below. $4 \cdot M_{sc}^{PUSCH} - Q'_{ACK}$ indicates that the maximum value of $Q'_{RI}$ is limited to the number of remaining REs except for a bit payload to which HARQ-ACK is mapped.

$$Q'_{RI} = \min\left(\left\lceil \frac{O \cdot M_{sc}^{PUSCH-initial} \cdot N_{symb}^{PUSCH-initial} \cdot \beta_{offset}^{PUSCH}}{\sum_{r=0}^{C-1} K_r} \right\rceil, M_{sc}^{PUSCH} - Q'_{ACK}\right) \quad \text{[Equation 3]}$$

Maximum code rates for multiple UCIs with different requirements may be differently configured. When the multiple UCIs with different requirements are transmitted on one channel, the UE may determine the amount of transmission resources based on the maximum code rate and/or the number of bits for UCI with a relatively strict requirement. Then, the UE may cause a channel on which the multiple UCIs are transmitted to satisfy a relatively strict requirement. This may be advantageous to guarantee transmission reliability of the UE.

The BS may configure, for the UE, a maximum code rate for transmission of multiple UCIs with different requirements on one channel. The BE may determine the amount of transmission resources based on the maximum code rate and/or the number of bits for the UCI with a relatively strict requirement and assume that the multiple UCIs are transmitted on one channel. The BS may decode a channel received from the UE based on the assumption.

HARQ-ACK Codebook Determination Depending on the Number of PDCCH Symbols

The reliability of URLLC transmission and reception may be affected by the reliability of a control channel. For example, the reliability of URLLC transmission and reception may be affected by PCFICH decoding performance. If the UE incorrectly decodes a PCFICH so that the UE incorrectly recognizes a control channel region (the number of symbols to which a control channel is allocated), the reliability of the control channel may be lowered. When the PCFICH is associated with a subslot, the UE may decode a DL channel in a state of incorrectly recognizing a DL TTI boundary (in a state of recognizing the TTI boundary differently from that configured by the BS). To prevent this situation, a method in which the BS configures, for the UE, information about a control channel region through a higher layer signal separately from the PCFICH is considered.

To reduce latency, both a DL TTI length and a UL TTI length may be configured as subslot TTIs. The DL TTI length and the UL TTI length configured for the UE may be different. For a UE requiring transmission of a large amount of UCI or data or a UE for which coverage is insufficient, the UL TTI length may be configured as a slot TTI although there is loss in terms of latency. The DL TTI length may be equally configured as the subslot TTI. The UE should transmit HARQ-ACK for a PDSCH received in a plurality of DL subslots in one UL slot. HARQ-ACK bits may be configured according to a processing time configuration for a subslot. Specifically, when the HARQ-ACK bits are configured, the following rules may be applied.

For FDD or FDD-TDD and primary cell frame structure 1, with two configured serving cells and PUCCH format 1b with channel selection or for FDD with one or more configured serving cells, and the higher layer parameters dl-STTI-Length='subslot' and ul-STTI-Length='slot', and PUCCH format 3 and without PUCCH format 4 configured, or for FDD with two or more configured serving cells and PUCCH format 3 and without PUCCH format 4/5 configured, $$n_{HARQ} = \sum_{c=0}^{N_{cells}^{DL}-1} N_c^{received}$$

where $N_{cells}^{DL}$ is the number of configured cells and $N_c^{received}$ is the number of transport blocks or the SPS release PDCCH/EPDCCH/SPDCCH, if any, received in serving cell c, and in
 subframe n−4
 slot n−4
 any of the subslots given in Table 8 according to the value of $X_p$ when the slot-PUCCH is transmitted in subframe m.

TABLE 8

| $X_p$ | Slot number | Subslot numbers |
|---|---|---|
| 4 | mod($n_s$,2) = 0 | {0,1,2} in subframe m-1 |
|  | mod($n_s$,2) = 1 | {3,4,5} in subframe m-1 |

TABLE 8-continued

Set of subslot numbers for $n_{HARQ}$ calculation

| $X_p$ | Slot number | Subslot numbers |
|---|---|---|
| 6 | mod($n_s$,2) = 0 | {0} in subframe m-1 {4,5} in subframe m-2 |
|  | mod($n_s$,2) = 1 | {1,2,3} in subframe m-1 |
| 8 | mod($n_s$,2) = 0 | {2,3,4} in subframe m-2 |
|  | mod($n_s$,2) = 1 | {0,1} in subframe m-1 {5} in subframe m-2 |

In case of subslot-PDSCH:
 the mapping to resource elements (k,l) on antenna port p not reserved for other purposes shall be in increasing order of first the index k over the assigned physical resource blocks and then the index l, starting from $l_0$ given in Table 6.4.2-1. The starting value $l_0$ and the value range of l depends on the number of symbols used for PDCCH and the subslot number in the subframe, according to Table 9, and
 in case of UE-specific reference signals,
 the PDSCH is not mapped to any physical resource blocks in frequency domain carrying PBCH or synchronization signals for the OFDM symbols of the given subslot.
 and in case the DCI associated with the subslot-PDSCH indicates the absence of the UE-specific reference signals (see DMRS position indicator field in 3GPP TS 36.212 [3]), the PDSCH is not mapped to any physical resource blocks in frequency domain that carried PBCH or synchronization signals for the OFDM symbols of the previous subslot.

TABLE 9

Starting value of index l, i.e. $l_0$, for subslot PDSCH

| Number of symbols used for PDCCH | Downlink subslot index | | | | | |
|---|---|---|---|---|---|---|
|  | #0 | #1 | #2 | #3 | #4 | #5 |
| 1 | 1 | 3 | 5 | 0 | 2 | 4 |
| 2 | — | 2 | 5 | 0 | 2 | 4 |
| 3 | — | 3 | 5 | 0 | 2 | 4 |

According to the above rules, when the DL TTI length is the subslot TTI, whether a PDSCH is transmittable in a subslot may be determined by the number of PDCCH symbols. For example, when the number of PDCCH symbols is 1, the PDSCH may be transmitted in subslot #0. When the number of PDCCH symbols is 2 or 3, the PDSCH may not be scheduled and transmitted in subslot #0.

When the DL TTI length is configured as the subslot TTI and the UL TTI length is configured as the slot TTI, the UE may need to transmit HARQ-ACK corresponding to the PDSCH received in subslot #0 in a specific UL slot. The UE may determine a HARQ-ACK codebook based on the number of PDCCH symbols. Specifically, when the number of PDCCH symbols is 1, HARQ-ACK for the PDSCH received in subslot #0 may be included in calculation of the number of HARQ-ACK bits to be transmitted in the UL slot. When the number of PDCCH symbols is 2 or 3, HARQ-ACK for the PDSCH received in subslot #0 may not be included in calculation of the number of HARQ-ACK bits to be transmitted in the UL slot.

The HARQ-ACK codebook determination operation based on the number of PDCCH symbols of the UE may be performed only when the number of PDCCH symbols is configured for the UE through a higher layer signal. As in a conventional operation, when the UE obtains the number of PDCCH symbols through a PCFICH, HARQ-ACK for the PDSCH received in subslot #0 may always be included in calculation of HARQ-ACK bits to be transmitted in the UL slot.

The UE may include information as to whether the UE is capable of performing the HARQ-ACK codebook determination operation based on the number of PDCCH symbols in UE capability and report the information to the BS. When the number of PDCCH symbols is configured through a higher layer signal, the UE may separately perform reporting on whether the UE is capable of performing the HARQ-ACK codebook determination operation based on the number of PDCCH symbols and, when the number of PDCCH symbols is configured through a physical layer signal (e.g., PCFICH), the UE may separately perform reporting on whether the UE is capable of performing the HARQ-ACK codebook determination operation based on the number of PDCCH symbols.

FIG. 11 is a conceptual diagram of a signal transmission method according to embodiments of the present disclosure.

Referring to FIG. 11, embodiments of the present disclosure may include checking, by the UE, whether a resource region for transmitting first UCI overlaps with a resource region for transmitting second UCI in the time domain (S1101), mapping the first UCI and the second UCI to one specific UL channel (S1103), and transmitting the specific UL channel (S1105).

The specific UL channel may include a first bit payload for the first UCI and a second bit payload for the second UCI. The number of bits of the first bit payload and the number of bits of the second bit payload may be determined based on preconfigured ratio information.

One or more resource regions for transmitting UCI, that overlap with the resource region for transmitting the first UCI and/or the resource region for transmitting the second UCI, may further be present. The UE may additionally perform one or more of the operation proposed to process collision for the same TTI length/different requirements, the operation proposed to process collision for different TTI lengths/different requirements, the operation proposed to transmit UCIs with different requirements, and/or the operation proposed to determine a HARQ-ACK codebook based on the number of PDCCH symbols.

Since examples of the above-described proposed methods may also be included in one of implementation methods of the present disclosure, it is obvious that the examples may be regarded as proposed methods. Although the above-described proposed methods may be independently implemented, the proposed methods may be implemented in a combined (aggregated) form of parts of the proposed methods. A rule may be defined such that information as to whether the proposed methods are applied (or information about rules of the proposed methods) is indicated by the BS to the UE through a predefined signal (e.g., a physical layer signal or a higher-layer signal).

Device Configuration

FIG. 12 is a block diagram illustrating a transmitting device 10 and a receiving device 20 configured to implement embodiments of the present disclosure. Each of the transmitting device 10 and receiving device 20 includes a transmitter/receiver 13, 23 capable of transmitting or receiving a radio signal that carries information and/or data, a signal, a message, etc., a memory 12, 22 configured to store various kinds of information related to communication with a wireless communication system, and a processor 11, 21 operatively connected to elements such as the transmitter/receiver 13, 23 and the memory 12, 22 to control the memory 12, 22 and/or the transmitter/receiver 13, 23 to allow the device to implement at least one of the embodiments of the present disclosure described above.

The memory 12, 22 may store a program for processing and controlling the processor 11, 21, and temporarily store input/output information. The memory 12, 22 may also be utilized as a buffer. The processor 11, 21 controls overall operations of various modules in the transmitting device or the receiving device. Particularly, the processor 11, 21 may perform various control functions for implementation of the present disclosure. The processors 11 and 21 may be referred to as controllers, microcontrollers, microprocessors, microcomputers, or the like. The processors 11 and 21 may be achieved by hardware, firmware, software, or a combination thereof. In a hardware configuration for an embodiment of the present disclosure, the processor 11, 21 may be provided with application specific integrated circuits (ASICs) or digital signal processors (DSPs), digital signal processing devices (DSPDs), programmable logic devices (PLDs), and field programmable gate arrays (FPGAs) that are configured to implement the present disclosure. In the case which the present disclosure is implemented using firmware or software, the firmware or software may be provided with a module, a procedure, a function, or the like which performs the functions or operations of the present disclosure. The firmware or software configured to implement the present disclosure may be provided in the processor 11, 21 or stored in the memory 12, 22 to be driven by the processor 11, 21.

The processor 11 of the transmitter 10 performs predetermined coding and modulation of a signal and/or data scheduled by the processor 11 or a scheduler connected to the processor 11, and then transmits a signal and/or data to the transmitter/receiver 13. For example, the processor 11 converts a data sequence to be transmitted into K layers through demultiplexing and channel coding, scrambling, and modulation. The coded data sequence is referred to as a codeword, and is equivalent to a transport block which is a data block provided by the MAC layer. One transport block is coded as one codeword, and each codeword is transmitted to the receiving device in the form of one or more layers. To perform frequency-up transformation, the transmitter/receiver 13 may include an oscillator. The transmitter/receiver 13 may include Nt transmit antennas (wherein Nt is a positive integer greater than or equal to 1).

The signal processing procedure in the receiving device 20 is configured as a reverse procedure of the signal processing procedure in the transmitting device 10. The transmitter/receiver 23 of the receiving device 20 receives a radio signal transmitted from the transmitting device 10 under control of the processor 21. The transmitter/receiver 23 may include Nr receive antennas, and retrieves baseband signals by frequency down-converting the signals received through the receive antennas. The transmitter/receiver 23 may include an oscillator to perform frequency down-converting. The processor 21 may perform decoding and demodulation on the radio signal received through the receive antennas, thereby retrieving data that the transmitting device 10 has originally intended to transmit.

The transmitter/receiver 13, 23 includes one or more antennas. According to an embodiment of the present disclosure, the antennas function to transmit signals processed by the transmitter/receiver 13, 23 are to receive radio signals and deliver the same to the transmitter/receiver 13, 23. The antennas are also called antenna ports. Each antenna may correspond to one physical antenna or be configured by a combination of two or more physical antenna elements. A signal transmitted through each antenna cannot be decomposed by the receiving device 20 anymore. A reference signal (RS) transmitted in accordance with a corresponding antenna defines an antenna from the perspective of the receiving device 20, enables the receiving device 20 to perform channel estimation on the antenna irrespective of whether the channel is a single radio channel from one physical antenna or a composite channel from a plurality of physical antenna elements including the antenna. That is, an antenna is defined such that a channel for delivering a symbol on the antenna is derived from a channel for delivering another symbol on the same antenna. An transmitter/receiver supporting the Multiple-Input Multiple-Output (MIMO) for transmitting and receiving data using a plurality of antennas may be connected to two or more antennas.

In embodiments of the present disclosure, the UE or the terminal operates as the transmitting device 10 on UL, and operates as the receiving device 20 on DL. In embodiments of the present disclosure, the eNB or the base station operates as the receiving device 20 on UL, and operates as the transmitting device 10 on DL.

The transmitting device and/or receiving device may be implemented by one or more embodiments of the present disclosure among the embodiments described above.

Detailed descriptions of preferred embodiments of the present disclosure have been given to allow those skilled in the art to implement and practice the present disclosure. Although descriptions have been given of the preferred embodiments of the present disclosure, it will be apparent to those skilled in the art that various modifications and variations can be made in the present disclosure defined in the appended claims. Thus, the present disclosure is not intended to be limited to the embodiments described herein, but is intended to have the widest scope consistent with the principles and novel features disclosed herein.

INDUSTRIAL APPLICABILITY

As described above, the present disclosure is applicable to various wireless communication systems.

The invention claimed is:

1. A method of transmitting an uplink signal, performed by a user equipment (UE) in a wireless communication system, the method comprising:
transmitting a hybrid automatic repeat request-acknowledgement (HARQ-ACK) in a physical uplink shared channel (PUSCH) based on the HARQ-ACK colliding with the PUSCH in a time domain and based on the HARQ-ACK and the PUSCH having a same priority,
wherein the priority of the HARQ-ACK is determined based on first downlink control information scheduling a physical downlink shared channel (PDSCH) related to the HARQ-ACK, and
wherein the priority of the PUSCH is determined based on second downlink information scheduling the PUSCH.

2. The method of claim 1, wherein the priority of the HARQ-ACK and the priority of the PUSCH are further determined based on a target service, quality of service (QoS), block error rate (BLER), transmission reliability, transmission latency, and/or processing time.

3. The method according to claim 1, wherein the UE is capable of communicating with at least one of another UE, a UE related to an autonomous driving vehicle, a base station and/or a network.

4. The method of claim 1, wherein the priority of the HARQ-ACK and the PUSCH are the same based on enhanced mobile broadband communication (eMBB) or ultra-reliable and low latency communication (URLLC).

5. The method of claim 1, wherein the HARQ-ACK is not transmitted in the PUSCH based on the HARQ-ACK colliding with the PUSCH in the time domain and based on the HARQ-ACK and the PUSCH having different priorities.

6. A user equipment (UE) for transmitting an uplink signal in a wireless communication system, the UE comprising:
a memory; and
a processor operatively coupled to the memory,
wherein the processor is configured to:
transmit a hybrid automatic repeat request-acknowledgement (HARQ-ACK) in a physical uplink shared channel (PUSCH) based on the HARQ-ACK colliding with the PUSCH in a time domain and based on the HARQ-ACK and the PUSCH having a same priority,
wherein the priority of the HARQ-ACK is determined based on first downlink control information scheduling a physical downlink shared channel (PDSCH) related to the HARQ-ACK, and
wherein the priority of the PUSCH is determined based on second downlink information scheduling the PUSCH.

7. The UE according to claim 6, wherein the UE is capable of communicating with at least one of another UE, a UE related to an autonomous driving vehicle, a base station and/or a network.

8. The UE of claim 6, wherein the priority of the HARQ-ACK and the priority of the PUSCH are further determined based on a target service, quality of service (QoS), block error rate (BLER), transmission reliability, transmission latency, and/or processing time.

9. The UE of claim 6, wherein the priority of the HARQ-ACK and the PUSCH are the same based on enhanced mobile broadband communication (eMBB) or ultra-reliable and low latency communication (URLLC).

10. The UE of claim 6, wherein the HARQ-ACK is not transmitted in the PUSCH based on the HARQ-ACK colliding with the PUSCH in the time domain and based on the HARQ-ACK and the PUSCH having different priorities.

11. A processor for a user equipment (UE) configured for receiving a downlink control channel in a wireless communication system, wherein the processor is configured with processor-executable instructions to control the UE, including a receiver, to carry out steps comprising:
transmitting a hybrid automatic repeat request-acknowledgement (HARQ-ACK) in a physical uplink shared channel (PUSCH) based on the HARQ-ACK colliding with the PUSCH in a time domain and based on the HARQ-ACK and the PUSCH having a same priority,
wherein the priority of the HARQ-ACK is determined based on first downlink control information scheduling a physical downlink shared channel (PDSCH) related to the HARQ-ACK, and
wherein the priority of the PUSCH is determined based on second downlink information scheduling the PUSCH.

12. The processor of claim 11, wherein the priority of the HARQ-ACK and the priority of the PUSCH are further determined based on a target service, quality of service (QoS), block error rate (BLER), transmission reliability, transmission latency, and/or processing time.

13. The processor of claim 11, wherein the priority of the HARQ-ACK and the PUSCH are the same based on enhanced mobile broadband communication (eMBB) or ultra-reliable and low latency communication (URLLC).

14. The processor of claim 11, wherein the HARQ-ACK is not transmitted in the PUSCH based on the HARQ-ACK colliding with the PUSCH in the time domain and based on the HARQ-ACK and the PUSCH having different priorities.

15. The processor according to claim 11, wherein the processor is capable of communicating with at least one of another UE, a UE related to an autonomous driving vehicle, a base station and/or a network.

* * * * *